US012584728B2

(12) United States Patent　　　　(10) Patent No.: US 12,584,728 B2
Goodwin et al.　　　　　　　　　　　(45) Date of Patent: Mar. 24, 2026

(54) MEASUREMENT OF MELT POOL POSITION IN ADDITIVE MANUFACTURING

(71) Applicant: NIKON CORPORATION, Tokyo (JP)

(72) Inventors: Eric Peter Goodwin, Oro Valley, AZ (US); Zhi-Wei Lin, Belmont, CA (US)

(73) Assignee: NIKON CORPORATION, Tokyo (JP)

( * ) Notice: Subject to any disclaimer, the term of this patent is extended or adjusted under 35 U.S.C. 154(b) by 204 days.

(21) Appl. No.: 18/032,841

(22) PCT Filed: Oct. 21, 2021

(86) PCT No.: PCT/US2021/056112
§ 371 (c)(1),
(2) Date: Apr. 20, 2023

(87) PCT Pub. No.: WO2022/087314
PCT Pub. Date: Apr. 28, 2022

(65) Prior Publication Data
US 2023/0392922 A1　　Dec. 7, 2023

Related U.S. Application Data

(60) Provisional application No. 63/104,414, filed on Oct. 22, 2020.

(51) Int. Cl.
*G01B 11/06*　　　(2006.01)
*B23K 26/03*　　　(2006.01)
(Continued)

(52) U.S. Cl.
CPC ........ *G01B 11/0608* (2013.01); *B23K 26/032* (2013.01); *B23K 26/062* (2015.10);
(Continued)

(58) Field of Classification Search
CPC ............ G01B 11/0608; G01B 11/0625; G01B 11/0658; G01B 11/0683; G01B 11/026;
(Continued)

(56) References Cited

U.S. PATENT DOCUMENTS 5,448,359 A * 9/1995 Schick ................... G01B 11/24
356/624
5,449,882 A * 9/1995 Black ................. B23K 26/0665
219/121.74

(Continued)

FOREIGN PATENT DOCUMENTS

CN　110352104 A　10/2019
CN　109778182 B　6/2020
(Continued)

OTHER PUBLICATIONS

Jan. 31, 2022 International Search Report issued in International Patent Application No. PCT/US2021/056112.
(Continued)

*Primary Examiner* — Georgia Y Epps
*Assistant Examiner* — Erin R Garber
(74) *Attorney, Agent, or Firm* — Oliff PLC

(57) ABSTRACT

Detectors are situated along a tilted optical axis to receive optical radiation from a work surface. Variations in the received optical power are used to estimate a work surface positional along a work surface axis. The received optical power can be emitted from the work surface and an esti-mated temperature of the work surface used to adjust the received optical power. One or two single element detectors or a linear detector can be used. A position of a focused spot produced from the received optical power at the linear detector can be used to assess work surface axial position.

39 Claims, 12 Drawing Sheets

(51) Int. Cl.

| | |
|---|---|
| *B23K 26/062* | (2014.01) |
| *B23K 26/08* | (2014.01) |
| *B23K 26/342* | (2014.01) |
| *G01B 11/02* | (2006.01) |

(52) U.S. Cl.
CPC ........ *B23K 26/0861* (2013.01); *B23K 26/342* (2015.10); *G01B 11/026* (2013.01); *G01B 11/0625* (2013.01); *G01B 11/0658* (2013.01); *G01B 11/0683* (2013.01)

(58) Field of Classification Search
CPC ............... B23K 26/032; B23K 26/062; B23K 26/0861; B23K 26/342; B23K 15/0086; B23K 15/0013; B23K 26/354; Y02P 10/25; B33Y 30/00; B22F 12/90; B22F 12/44

See application file for complete search history.

(56) References Cited

U.S. PATENT DOCUMENTS

| | | | |
|---|---|---|---|
| 6,122,564 | A | 9/2000 | Koch et al. |
| 6,597,006 | B1 | 7/2003 | McCord et al. |
| 6,925,346 | B1 * | 8/2005 | Mazumder ......... B23K 35/0244 700/121 |
| 2011/0061591 | A1 * | 3/2011 | Stecker .................. B33Y 40/00 118/663 |
| 2018/0185959 | A1 | 7/2018 | Mathews, Jr. et al. |
| 2018/0264600 | A1 * | 9/2018 | Sugino ................... B23K 26/03 |
| 2019/0076964 | A1 * | 3/2019 | Ichinohe ................ B23K 26/00 |
| 2019/0118286 | A1 | 4/2019 | Sugatani et al. |
| 2020/0232785 | A1 | 7/2020 | Mosher et al. |

FOREIGN PATENT DOCUMENTS

| | | | | |
|---|---|---|---|---|
| CN | 111474734 | A * | 7/2020 | ......... G01B 11/0608 |
| EP | 3473358 | A1 | 4/2019 | |
| JP | 2002-519200 | A | 7/2002 | |
| JP | 2018-034514 | A | 3/2018 | |
| JP | 2019-77892 | A | 5/2019 | |
| WO | 93/11403 | A1 | 6/1993 | |
| WO | 2018/182751 | A1 | 10/2018 | |

OTHER PUBLICATIONS

Jan. 31, 2022 Written Opinion issued in International Patent Application No. PCT/US2021/056112.

Jul. 30, 2024 Office Action issued in Japanese Patent Application No. 2023-524751.

Apr. 23, 2024 Office Action Issued in Japanese Patent Application No. 2023-524751.

Mar. 6, 2025 Communication pursuant to Article 94(3) EPC issued in European Patent Applciation No. 21807430.0.

Aug. 4, 2025 Office Action issued in Chinese Patent Application No. 202180072224.1.

Aug. 12, 2025 Office Action issued in Japanese Patent Application No. 2024-192419.

* cited by examiner

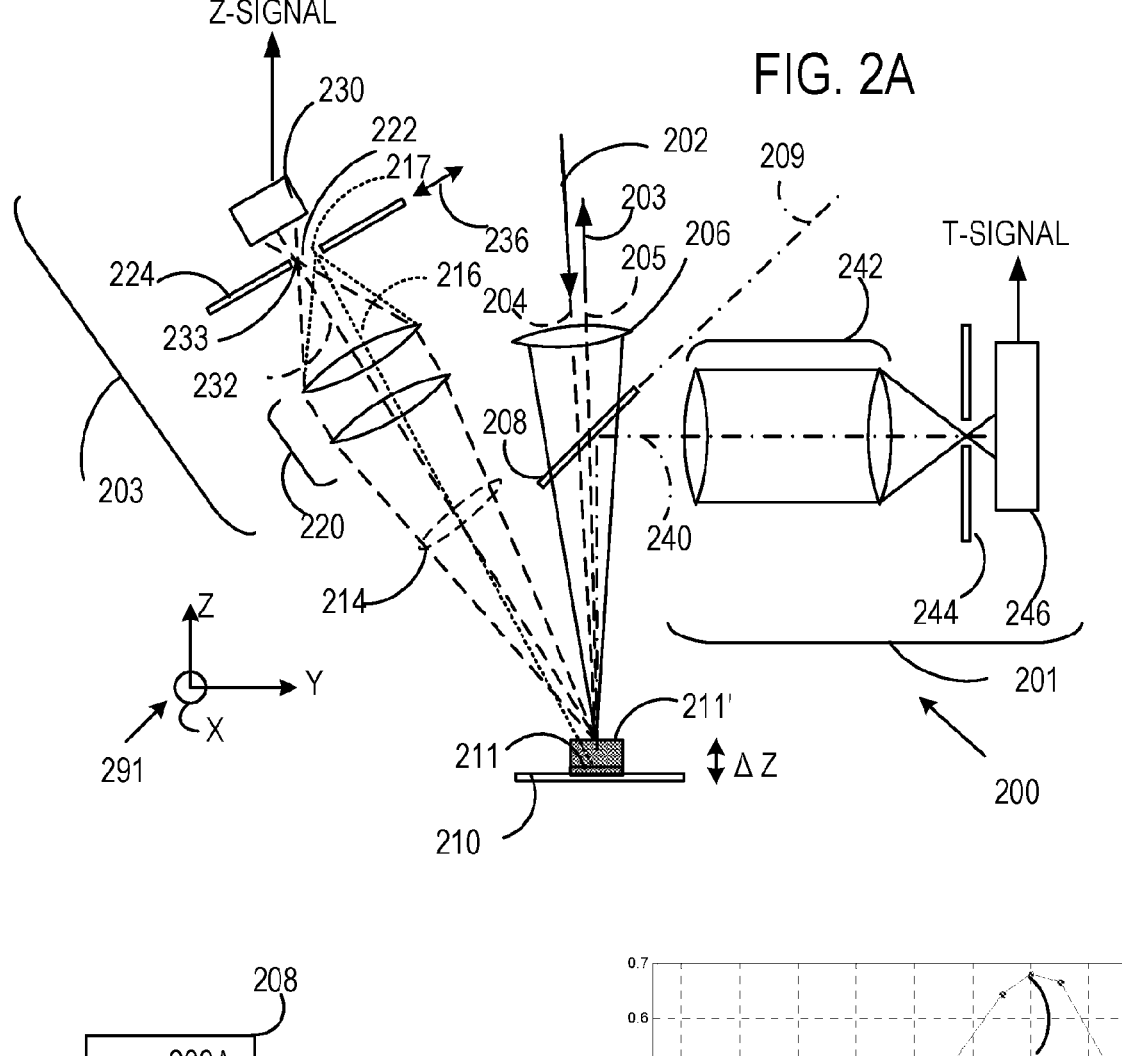
FIG. 2A
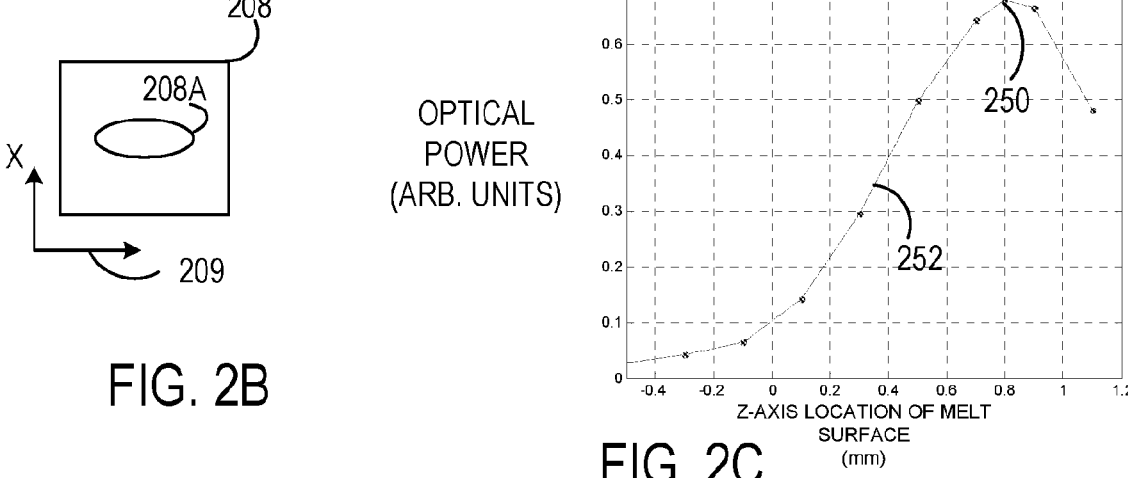
FIG. 2B
FIG. 2C

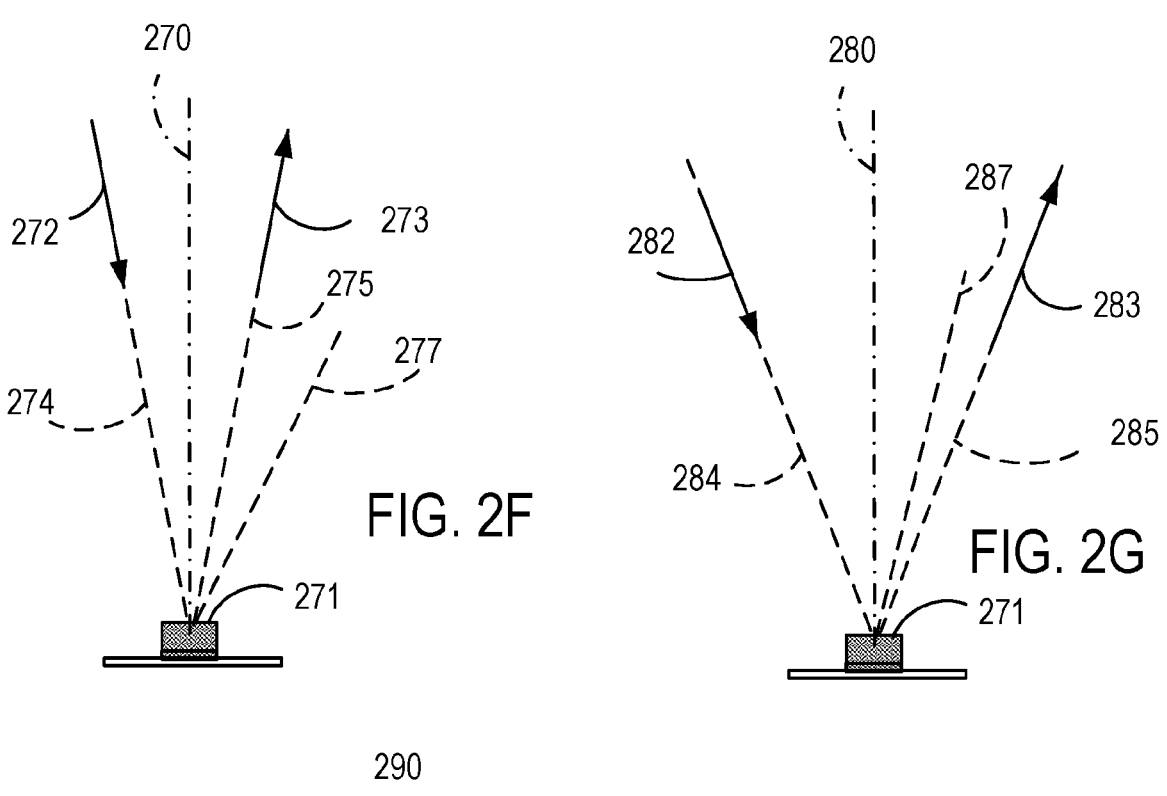
FIG. 2F
FIG. 2G
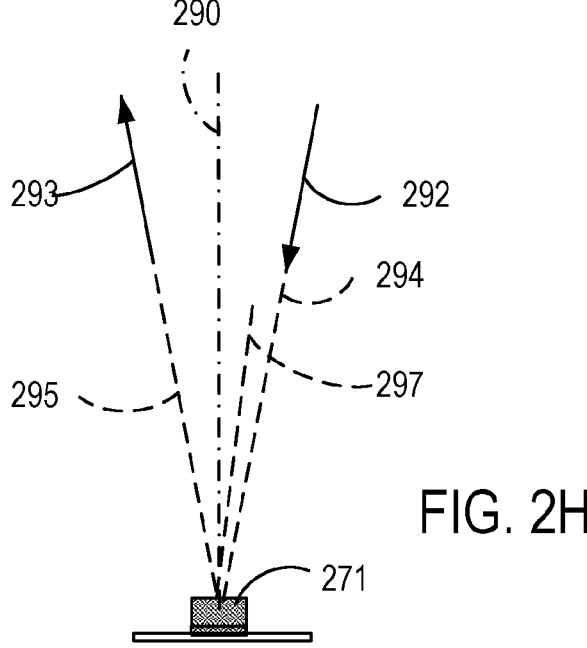
FIG. 2H

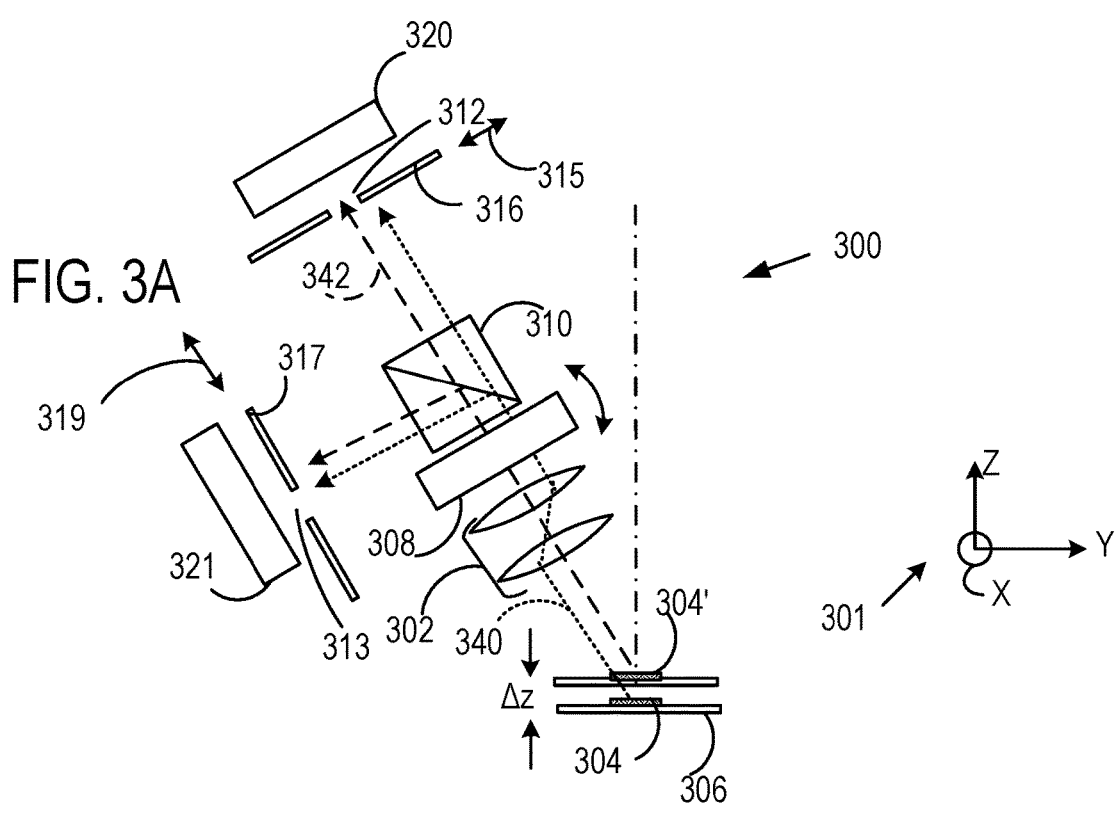
FIG. 3A
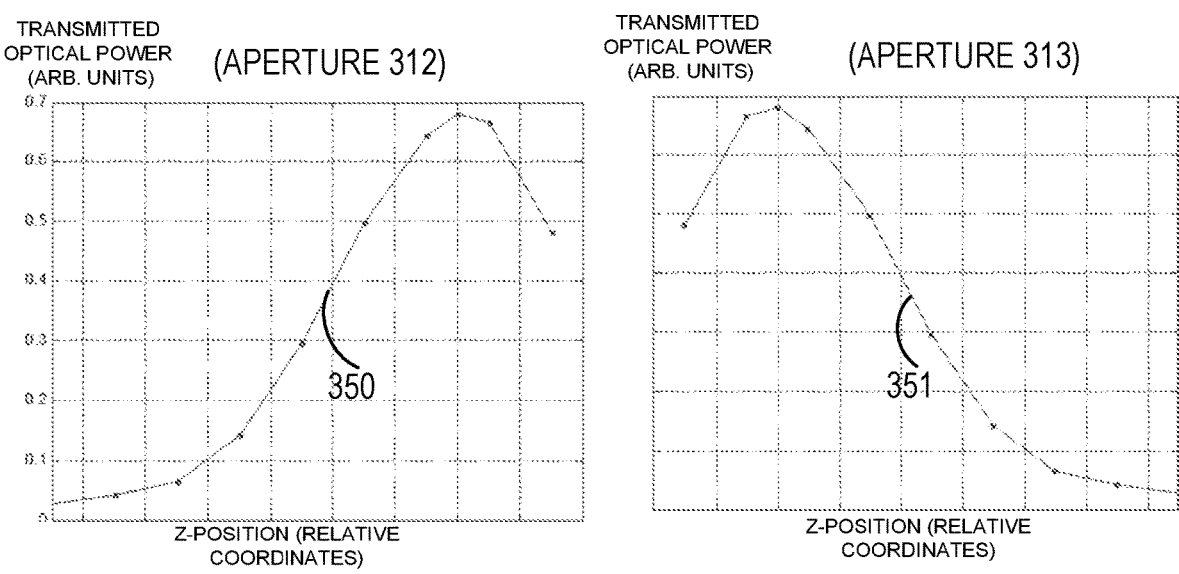
FIG. 3B
TRANSMITTED
OPTICAL POWER
(ARB. UNITS)     (APERTURE 312)
Z-POSITION (RELATIVE
COORDINATES)
FIG. 3C
TRANSMITTED
OPTICAL POWER
(ARB. UNITS)     (APERTURE 313)
Z-POSITION (RELATIVE
COORDINATES)

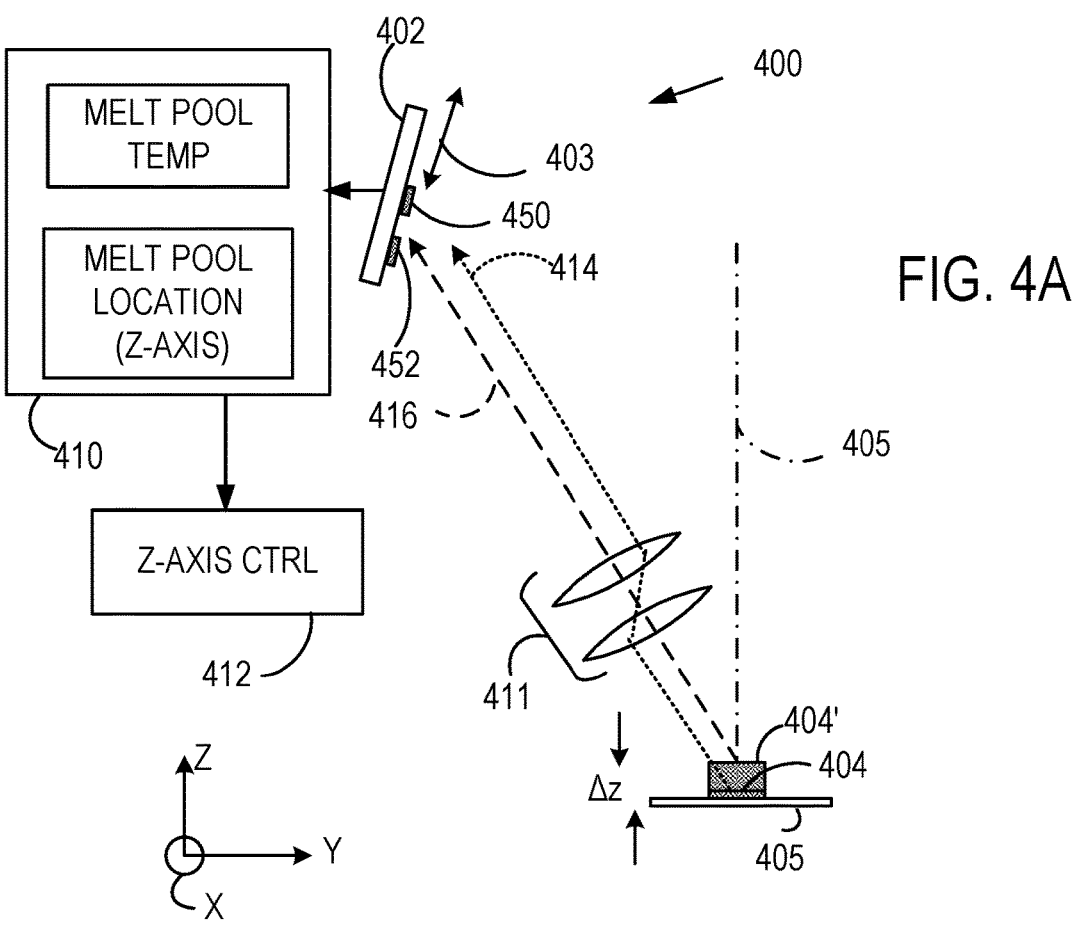
FIG. 4A
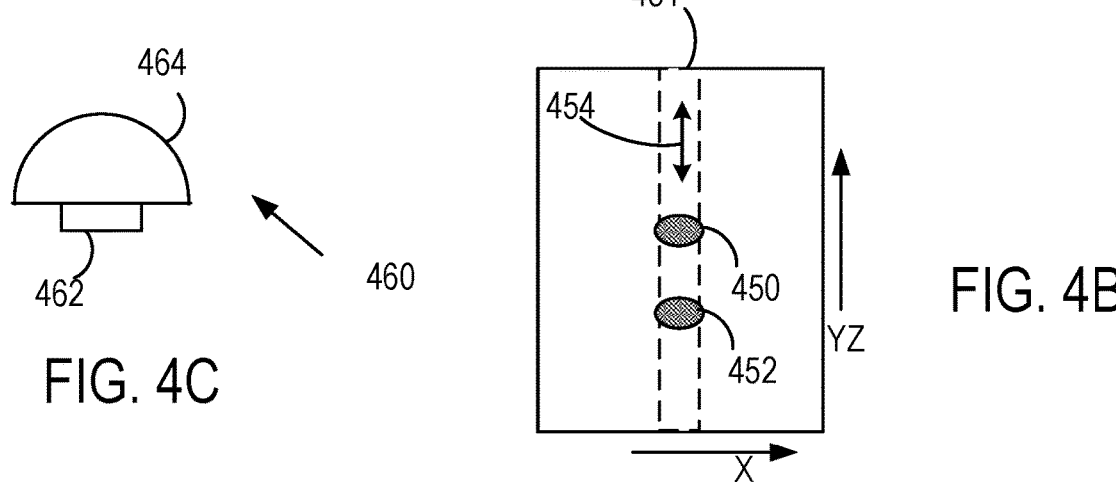
FIG. 4C
FIG. 4B

INTENSITY (ARB. UNITS)

LOCATION ON LINEAR DETECTOR (YZ-COORDINATE)

INTENSITY (ARB. UNITS)

LOCATION ON LINEAR DETECTOR (YZ-COORDINATE)

INTENSITY (ARB. UNITS)

LOCATION ON LINEAR DETECTOR (ARB. UNITS)

MEASUREMENT OF MELT POOL POSITION IN ADDITIVE MANUFACTURING

This is a U.S. National Stage of International Application No. PCT/US2021/056112 filed Oct. 21, 2021, which claims the benefit of U.S. Provisional Application No. 63/104,414 filed Oct. 22, 2022.

FIELD

The disclosure pertains to assessing material deposition in additive manufacturing

BACKGROUND

Some additive manufacturing systems use a laser processing beam to create a melt pool to which additional material is directed. This additional material is incorporated into the melt pool, increasing a height of the manufactured part. It is desirable to measure relating to part height. Accordingly, improved approaches are needed.

SUMMARY

Representative apparatus comprise a tracking optical system situated along a tracking axis, the tracking optical system comprising at least one focus element and at least one photodetector. The at least one focus element is situated to receive optical radiation from a melt pool and direct the received optical radiation toward the photodetector. The tracking axis is tilted with respect to a processing axis and the photodetector includes at least one single pixel photodetector or a linear detector. An optical receiver is coupled to the photodetector and operable to produce a tracking signal associated with a position of the melt pool along the processing axis based on the received optical radiation directed to the photodetector. In some examples, the tracking axis is tilted by an angle of at least 5, 10, 15, 20, 25, 30, 35, 40, 45, 50, 60, 70, 80, or 90 degrees with respect to the processing axis. In typical examples, the optical system further comprises an aperture plate situated to attenuate the received optical radiation directed toward the photodetector and the least one optical element is a lens that is situated to focus the received optical radiation from the melt pool proximate the aperture plate. In some representative examples, the aperture plate defines a circular aperture, a rectangular aperture, a slit, or two or more aperture edges. In some cases, the aperture plate is situated to block between 20% and 80% of the received optical radiation from the focus element so that beam displacements in opposite directions produce opposite changes in received optical power at the photodetector. In some examples, a processing beam source is operable to produce the processing beam and a positioning element is responsive to the tracking signal to adjust a relative position of the melt pool and the tracking axis. In some examples, the positioning element is a stage operable to adjust the position of the melt pool along the processing axis.

According to additional examples, the at least one detector of the tracking optical system includes a first detector and a second detector and is situated so that the optical receiver is operable to produce a corresponding first tracking signal and a second tracking signal associated with the position of the melt pool along the processing axis based on portions of the received radiation. The first tracking signal and the second tracking signal are configured to have opposite slopes with respect to changes in position of the melt pool along the processing axis. In convenient examples, the optical system further comprises a first aperture plate and a second aperture plate situated to attenuate the received optical radiation directed toward the first photodetector and the second photodetector, respectively. In some examples, the at least one photodetector is a linear array and the optical receiver is coupled to the photodetector and operable to produce the tracking signal associated with a position of the melt pool along the processing axis based on a location at which the received optical radiation is incident to the photodetector. In some embodiments, the position of the melt pool along the processing axis is based on a centroid of an intensity pattern of the radiation incident to the photodetector.

In some examples, a processing beam source is operable to produce the processing beam and a positioning element is responsive to the tracking signal to adjust a relative position of the melt pool and the tracking axis. In representative examples, a beam splitter is situated to direct a first portion and a second portion of the received radiation to corresponding first and second regions of the linear detector array. According to some embodiments, the first portion and the second portion of the received radiation are different spectral portions and the beam splitter is a dichroic beam splitter that selectively directs the different spectral portions to the corresponding first and second regions of the linear detector array. In further examples, the beam splitter is situated so that the first portion and a second portion of the received radiation are directed to corresponding first and second regions of the linear detector array having a separation that increases with increasing distance to the melt pool.

Representative systems include a processing beam source situated to direct a processing beam along a processing axis to a working area of a substrate so that the processing beam is focused at the working area. An optical focus sensor is situated to receive optical radiation from the working area in response to the processing beam along an axis that is tilted with respect to the processing axis and establish a position of the processing beam focus with respect to the working area. The optical focus sensor includes at least one of a single pixel detector and a linear detector situated to receive the optical radiation.

Methods comprise receiving optical radiation from a work area of a substrate along a tracking axis that is tilted with respect to a substrate axis that is perpendicular to the work area. Power of the optical radiation received from the work area and transmitted by an aperture situated along the tracking axis is measured. Based on the measured power, a displacement of the work area along the substrate axis is estimated. In some cases, the displacement of the work area is adjusted based on the displacement or one or more processing condition are modified. In typical examples, the optical radiation from the work area is produced by irradiation of the work area with a processing beam or is a portion of a tracer beam directed to the work area. In further examples, the displacement of the work area is adjusted by moving the work area along the substrate axis or adjusting a processing beam that is directed to the work area. In some examples, the optical radiation is associated with a melt pool produced by the processing beam such as blackbody radiation or other radiation produced based on a temperature of the melt pool. In additional examples, a temperature of the melt pool is estimated, and the measured power is adjusted based on the estimated temperature, wherein the displacement of the work area along the substrate axis is determined based on the adjusted measured power. In other typical embodiments, measuring the power comprises measuring first and second powers of the optical radiation received from the work area and transmitted by first and second apertures situated along the tracking axis, wherein the displacement of the work area along the substrate axis is determined based on the first and second powers.

Additional representative methods comprise receiving optical radiation from a work area of a substrate along a tracking axis that is tilted with respect to a substrate axis that is perpendicular to the work area and directing the received optical radiation to a linear detector. Based on a location at which the received optical radiation is incident to the linear detector, a displacement of the work area along the substrate axis is determined and the displacement of the work area or a processing condition is adjusted.

Detecting devices that detect a melt pool produced by a processing beam comprise a first light receiving device that receives a first radiation along a first axis emitted from the melt pool and a second light receiving device that receives a second radiation along a second axis inclined with respect to the first axis emitted from the melt pool. The first light receiving device can include a first condensing optical system that condenses the first radiation and a first photodetector that photoelectrically converts the condensed first radiation. The first light receiving device can include an aperture member defining an aperture situated at a condensing position of the first radiation by the first condensing optical system, and the first photodetector receives the first radiation through the aperture of the aperture member. The first photodetector can include a linear detector arranged at a condensing position of the first radiation by the first condensing optical system and includes photoelectric conversion elements arranged in a one-dimensional direction. In some examples, a first angle formed by the propagation axis of the processing beam and the first axis is larger than a second angle formed between a propagation axis of the processing beam and the second axis. In further examples, a second angle formed between a propagation axis of the processing beam and the second axis is different from a third angle formed between the propagation axis of the processing beam and an axis of specular reflection of the processing beam from the melt pool. In additional examples, a second angle formed between a propagation axis of the processing beam and the second axis is smaller than a third angle formed between the propagation axis of the processing beam and an axis of specular reflection of the processing beam from the melt pool. According to the disclosure, a second angle formed between a propagation axis of the processing beam and the second axis is larger than a third angle formed between the propagation axis of the processing beam and an axis of specular reflection of the processing beam from the melt pool. In a typical example, the second axis is slightly tilted from the propagation axis of the processing beam. The second axis can be substantially parallel to the propagation axis of the processing beam. In examples, a folding member is arranged in the optical path of the processing beam and bends the second axis. The second radiation can be received by the second light receiving device via the folding member.

In further examples, the detecting devices include a controller, and of claim 29, the first light receiving device includes a first photodetector that photoelectrically converts the first radiation, the second light receiving device includes a second photodetector that photoelectrically converts the second radiation, and the controller calculates a first output from the first photodetector and a second output from the second photodetector. In some examples, the controller obtains a dimension of the melt pool based on the first output and the second output. The dimension of the melt pool includes at least one of height of the melt pool and dimension of the melt pool that is perpendicular to a height direction. In further examples, a processing device that processes a workpiece by forming a melt pool on the workpiece with a processing beam comprises the detecting device. In some examples, a property changing device is situated to change a property of the processing beam such as beam shape, size, power, state of polarization, propagation direction, or other property based on an output from the property changing device. A material supply device is situated to supply one or more materials to the melt pool. The processing device can build an object on the workpiece by supplying the materials to the melt pool.

The foregoing and other features and advantages of the disclosure will become more apparent from the following detailed description, which proceeds with reference to the accompanying figures.

BRIEF DESCRIPTION OF THE DRAWINGS

FIG. 2A illustrates a portion of an AMS that includes an optical height sensor and an optical melt pool temperature sensor.

FIG. 2B illustrates a representative beam splitter for use in the optical height sensor of FIG. 2A.

FIG. 2C is a graph illustrating detected optical power as a function of aperture position for the representative optical height sensor of FIG. 2A.

FIGS. 2D-2H illustrate representative arrangements of processing beam and temperature sensor axes.

FIG. 3A illustrates a portion of an AMS that includes an optical height sensor that includes dual photodetectors and respective apertures.

FIGS. 3B-3C are graphs illustrating detected optical power as a function of aperture position for each of the dual detectors of the representative optical height sensor of FIG. 3A.

FIG. 4A illustrates a portion of an AMS that includes an optical height sensor that includes a linear detector array.

FIG. 4B illustrates translation of a beam on the linear detector array of FIG. 4A as a function of height variations.

FIG. 4C illustrates a linear detector array and a cylindrical lens that increases optical power to the linear detector array.

FIG. 5B illustrates focused spot position on the linear detector array of FIG. 5A for two different heights.

DETAILED DESCRIPTION

Figure 1:
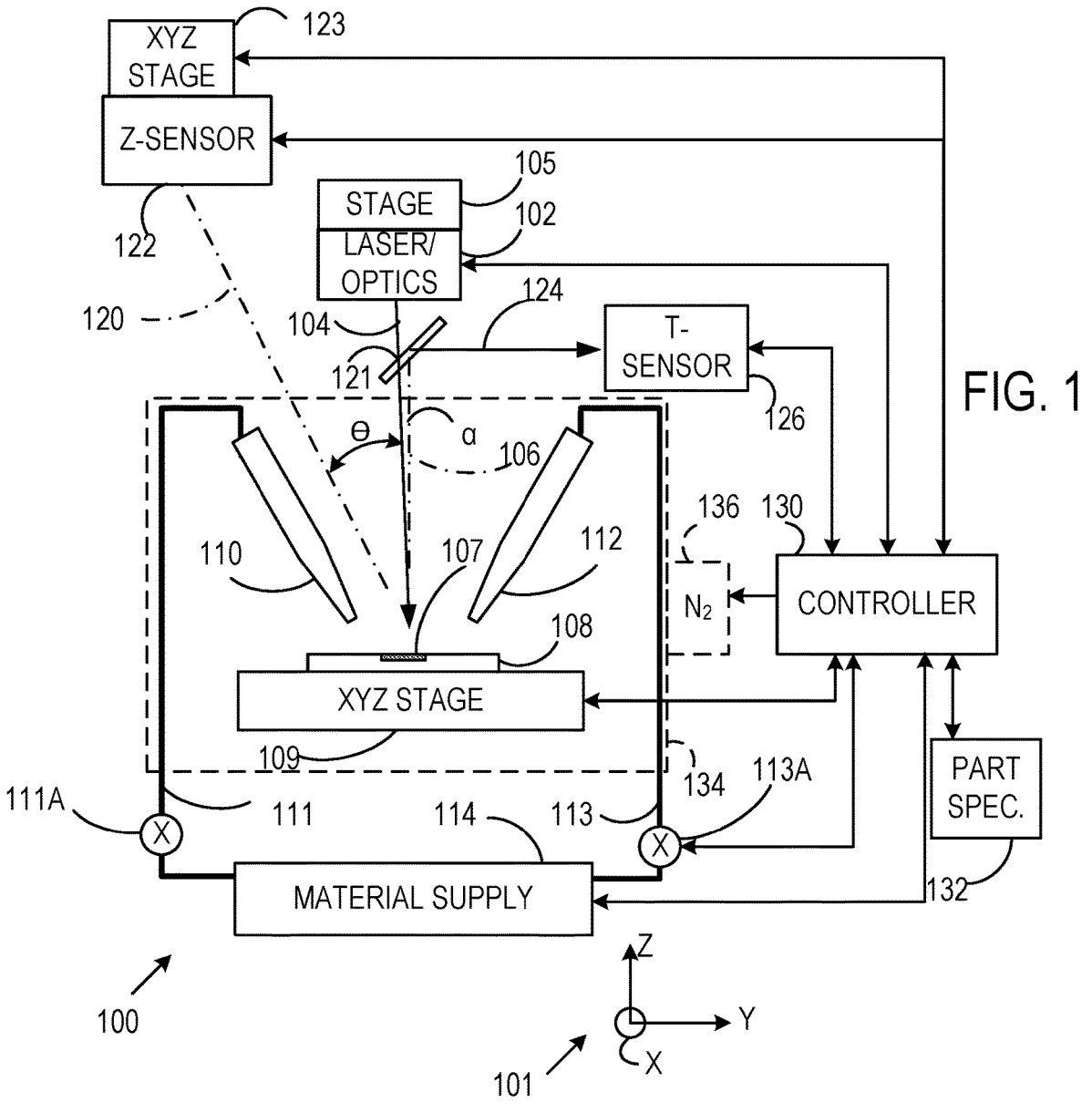
FIG. 1 illustrates a representative additive manufacturing system (AMS) that includes an optical height sensor.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present, or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

For convenience in the following description, the terms "light" and "optical radiation" refer to propagating electromagnetic radiation in a wavelength range of 300 nm to 10 μm, but other wavelengths can be used. This radiation is referred to herein as propagating in one or more "beams" that typically are based on optical radiation produced by a laser such as a laser diode, other light source, or emitted from a melt pool or other thermal source. Beams can have a spatial extent associated with one or more laser transverse modes and can be substantially collimated.

For convenience, beams are described as propagating along one or more axes. Such axes generally are based on one or more line segments so that an axis can include a number of non-collinear segments as the axis is bent or folded or otherwise responsive to mirrors, prisms, lenses, and other optical elements. The term "lens" is used herein to refer to a single refractive optical element (a singlet) or a compound lens that includes one or more singlets, doublets, or other compound lenses. In some examples, beams are shaped or directed by refractive optical elements, but in other examples, reflective optical elements such as mirrors are used, or combinations of refractive and reflective elements are used. Such optical systems can be referred to as dioptric, catoptric, and catadioptric, respectively. Other types of refractive, reflective, diffractive, holographic and other optical elements can be used as may be convenient. In some examples, beam splitters such as cube beam splitters are used to separate an input beam into a transmitted beam and a reflected beam, but plate or other beam splitters can be used. As used herein, angles that are less than 0.5, 1, 2, 5, 10, or 20 degrees are referred to as slight angles and axes that are at angles of less than 0.5, 1, 2, 5, 10, or 20 degrees are referred to as substantially parallel.

The examples are described with reference to an XYZ coordinate system and generally describe methods and apparatus for height adjustment or Z-axis. In most examples, thermally induced radiation (such as blackbody radiation) is used to estimate height changes, but a dedicated optical beam or portions of a processing beam can be used. Single element photodetectors (referred to also as single pixel photodetectors) or linear detectors are convenient, but imaging array detectors can be used, although such detectors can be unnecessarily complex and expensive in comparison with single element or linear detectors. An axis tilted with respect to a working surface normal is referred to in some cases as a tracking axis or simply as a tilted axis. A processing beam is also delivered on an axis having a slight tilt, but it will be clear in the description which axis is intended. Working surface location can be measured with respect to a surface normal or a processing beam axis, and in either case such location measurements are referred to as height measurements, although generally height is preferably measured with respect to the surface normal. A working surface or melt pool axis is an axis perpendicular to the working surface or melt pool and typically slightly different from the processing axis. "Optical receiver" refers to an electronic system operable to produce an output, either digital or analog, responsive to optical power detected with one or more photodetectors and can includes processing to compensate for substrate temperature or other processing. Such processing can be performed with additional processing hardware or processor-executable instructions as well.

Representative Additive Manufacturing System

Referring to FIG. 1, a representative additive manufacturing system (AMS) 100 includes a laser and optical system 102 situated to direct a processing beam along an axis 104 that is tilted by an angle α with respect to an axis 106 that is perpendicular to a target area 107 on a substrate 108. A representative XYZ coordinate system 101 is shown for convenient description. An xyz-axis stage 105 is coupled to the laser optical system 102 to adjust a processing beam focus size or focus location. The processing beam is generally directed to the target area 107 that is to be melted and for this reason the target area is also referred to herein as the melt pool. In typical AMS applications, the processing beam provides sufficient power to produce the melt pool. The substrate 108 is retained by an XYZ stage 109. During processing, movement of the stages 105, 109 can be coordinated so that both are moved simultaneously or sequentially. In other examples, the stage 105, or XYZ stage 109 can be 5-, or 6-axis stage system. A part in fabrication can be moved relative to a process head or the process head can be moved relative to the part, or both can be movable relative to each other, In the following, a Z-sensor is used for determinations with respect to a processing beam . . . .

Nozzles 110, 112 are coupled to a material supply 114 by supply lines 111, 113, respectively and can deliver material to the melt pool 107 to fabricate an intended part. The nozzles 110, 112 and the substrate 108 are situated in a chamber 134 that is coupled to a reservoir 136 that contains an inert gas such as nitrogen so that processing can be performed in a suitable environment.

During processing, material from the nozzles 110, 112 is added to the melt pool 107 and a Z-position of the melt pool 107 changes. This height change can be measured with a Z-sensor 122 that is situated to receive optical radiation (and typically optical radiation emitted by the melt pool 107 such as blackbody radiation or other thermal radiation emitted in response to the processing beam) along an axis 120 that is tilted by an angle θ with respect to the axis 106, wherein θ is generally greater than 5, 10, 15, 20, 25, 30, 35, 40, 45, or 50 degrees. In other examples, an additional optical source can be provided that directs a beam to the melt pool 107 and portions of this beam are used by the Z-sensor 122. The optical radiation received by the Z-sensor 122 can be visible or infrared radiation or radiation in other spectral ranges. Visible and infrared radiation is convenient due to the availability of inexpensive detectors of these spectral ranges. Alternatively, reflected or scattered portions of the processing beam can be used by the Z-sensor 122. In some cases, portions of the processing beam can be used. Emitted optical power from the melt pool 107 depends on melt pool temperature, and typically a measure magnitude of the optical radiation received at the Z-sensor 122 is adjusted based on melt pool temperature in determining melt pool height. The Z-sensor 122 can be secured to an xyz stage 123 to permit positioning along and about the axis 120. Alternatively, the laser optics 102 and the Z-sensor can be coupled to a common xyz stage. The Z-sensor 122 is coupled to a controller 130 so that processing beam focus, substrate position, or processing conditions such as material flow rate or processing beam power can be adjusted. The controller 130 is coupled to a database 132 that includes part specifications to be used in manufacturing and to valves 111A, 113A that can control material flow to the melt pool 107.

The processing beam is delivered to the melt pool 107 through a beam splitter 121 that is situated to receive optical radiation from the melt pool 107 and direct the optical radiation to a temperature sensor (T-sensor) 126. Typically, the T-sensor 126, the Z-sensor 122 and the laser system 102 are positionable with a common xyz-stage. The beam splitter 121 typically includes an aperture that transmits the processing beam and a portion about the aperture that reflects optical radiation from the melt pool 107. Other beam splitters such as neutral or dichroic beam splitters can be used and in other examples, the processing beam is reflected by a beam splitter to the substrate 108 and the temperature sensor 126 receives optical radiation transmitted by the beam splitter. In still other examples, a beam splitter is not used and the optical paths to the laser system 102 and the temperature sensor 126 do not overlap. The optical radiation emitted from the melt pool 107 is based on melt pool temperature so that the received optical power can be used to assess melt pool temperature. A temperature output of the temperature sensor 126 can be used in conjunction with the Z-sensor 122 to compensate the dependence of the optical power at the Z-sensor 122 on melt pool temperature. In alternative embodiments, the Z-sensor 122 can be rotated and measure the position of the melt pool 107 along X, Y, or other axis or one or more additional sensors provided Multiple sensors can be arranged in different configurations, provide different position information, and permit compensation of position or other dependencies. For example, the Z-sensor 122 can be situated to measure the position of the melt pool 107 along the X-axis and the Y-axis.

Representative Single Detector Z-Sensor

FIG. 2A illustrates an AMS 200 and shows a representative Z-sensor 203 and T-sensor 201. An XYZ coordinate system 291 is used for convenient description. Referring to FIG. 2A, a processing beam 202 is directed along a tilted axis 204 to a lens 206 and through a beam splitter 208 to a surface 211 of a melt pool on a substrate 210. As shown in FIG. 2B, the beam splitter 208 is situated along an axis 209 that is tilted with respect to the X-axis and Y-axis of the coordinate system 291 and includes an aperture 208A that permits the processing beam 202 to be transmitted. Because the beam splitter 208 is tilted, the aperture 208A is elongated to provide an approximately circular effective aperture in a plane perpendicular to the axis 204 for transmission of the processing beam 202. Emitted radiation from the melt pool is directed along an axis 240 to the beam splitter 208 and to the T-sensor 201 that includes a lens 242 that focusses the emitted radiation through an aperture defined in an aperture plate 244 to a detector 246. The detector 246 produces an output signal associated with melt pool temperature.

The Z-sensor 203 is situated along a tilted axis 216 and includes a lens 220 that directs emitted radiation 214 from the surface 211 towards an aperture 222 defined in an aperture plate 224. Emitted radiation from the surface 211 is focused to a first location 217. A detector 230 is situated optically behind the aperture plate 224 and produces a Z-signal that can be used to determine a Z-axis location of the surface 211. During processing, the surface 211 is built up to become a surface 211' having a displacement Δz with respect to the surface 211. Emitted radiation from the surface 211' then propagates along an axis 232 to a second focus 233 that is displaced from the first focus 217. Because the first focus 217 and the second focus 233 are displaced, the received emitted radiation can be differently attenuated at the aperture plate 224 so that the detector 230 produces different output signals which can be associated with Z-axis displacements such as ΔZ.

The position of the aperture 222 along an axis 236 can be selected to produce a suitable Z-dependent attenuation. As shown in FIG. 2C, the aperture can be centered with respect to a beam focus of melt pool radiation at 250. With additional Z-displacements in either direction, the received optical power decreases. However, if the aperture is situated to block a portion of the focused beam such as at 252, +Z axis displacement increases received beam power and −z displacement decreases received power, permitting processing beam or substrate stage control to be adjusted in a suitable direction.

Figure 2D:
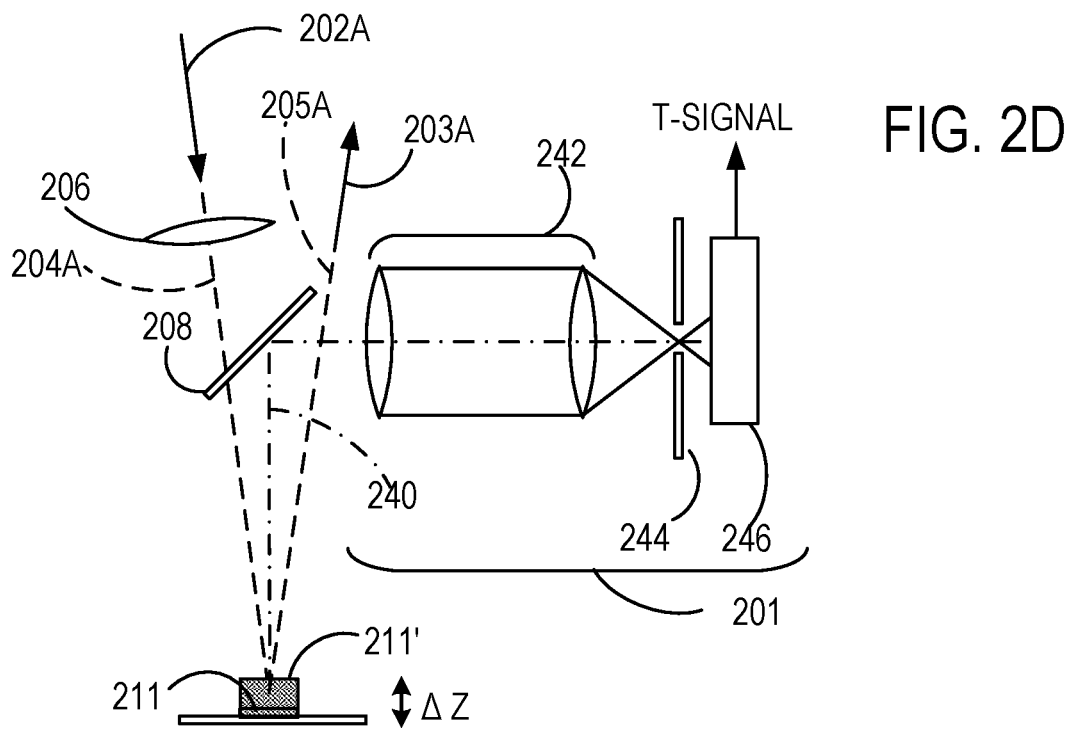

In the example configuration of FIG. 2A, the processing beam 202 is directed at a slight angle of incidence to the surface 211 and produces a specularly reflected beam 203 that propagates along an axis 205 that is between the axis 204 and the axis 240 associated with the T-sensor 201. Other configurations can be used, and the axis 240 need not be perpendicular to the surfaces 211, 211'. For example, referring to FIG. 2D, a processing beam 202A can be directed along an axis 204A to the surface 211 to produce a specularly reflected beam 203A that propagates along axis 205A that is at an angle greater than an angle of the axis 240. In another example shown in FIG. 2E, a processing beam 202B can be directed along an axis 204B to the surface 211 to produce a specularly reflected beam 203B that propagates along axis 205B that is at an angle that is oppositely directed from the axis 240.

Figure 2E:
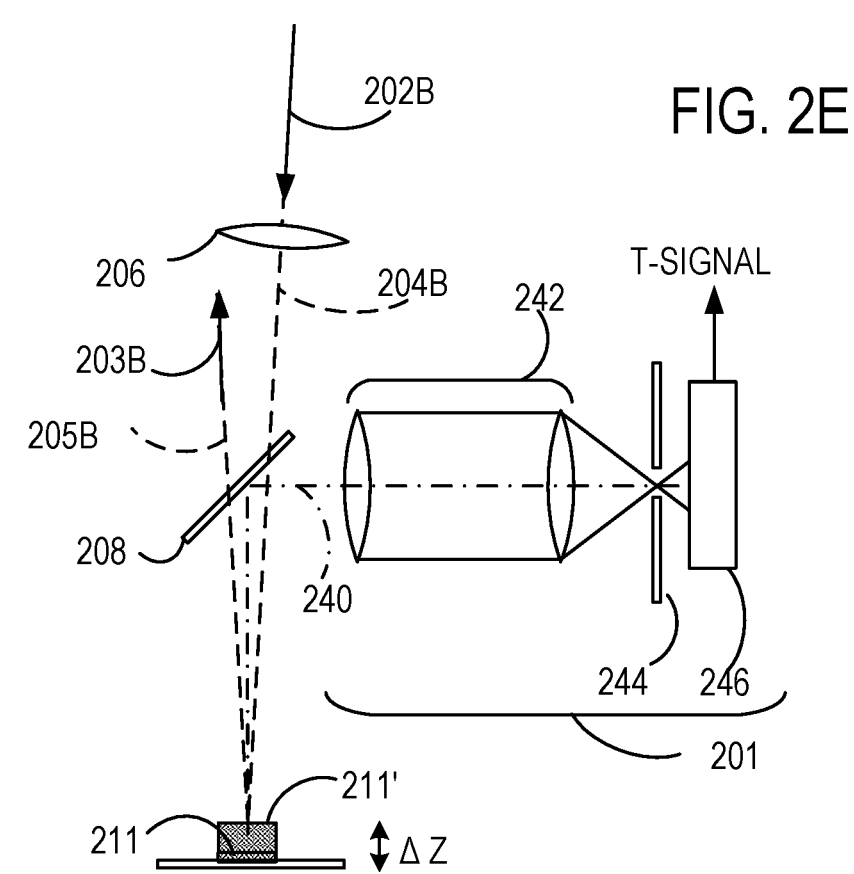

Arrangements of axes such as those of FIGS. 2A and 2E-2F are shown in FIGS. 2F-2H with optical elements omitted for convenient illustration. In FIG. 2F, a processing beam 272 is incident along an axis 274 and a reflected portion of the processing beam 273 is reflected along an axis 275 shown with respect to a perpendicular 270 to a surface 271. A temperature sensor is situated to receive radiation along an axis 277 that is at an angle with respect to the perpendicular 270 that is greater than that of the axis 275. In FIG. 2G, a processing beam 282 is incident along an axis 284 and a reflected portion of the processing beam 283 is reflected along an axis 285 shown with respect to a perpendicular 280 to the surface 271. A temperature sensor is situated to receive radiation along an axis 287 that is at an angle with respect to the perpendicular 280 that is less than that of the axis 285 and is thus situated between the perpendicular 280 and the axis 285. In FIG. 2H, a processing beam 292 is incident along an axis 294 and a reflected portion of the processing beam 293 is reflected along an axis 295 shown with respect to a perpendicular 290 to the surface 271. A temperature sensor is situated to receive radiation along an axis 297 that is at an angle with respect to the perpendicular 290 that is less than that of the axis 294 and is thus situated between the perpendicular 290 and the axis 294. It is not necessary that any axis of the above axes be normal to the surface 271.

Representative Dual Detector Z-Sensor

Referring to FIG. 3A, a representative dual detector Z-sensor 300 includes a lens 302 situated to direct emitted radiation from an area 304 of a substrate 306 to a tilt plate 308. An XYZ coordinate system 301 is used for convenient description A beam splitter 310 directs portions of the focused emitted radiation toward respective apertures 312, 313 defined in aperture plates 316, 317 and to detectors 320, 321. The beam splitter 310 can be a neutral beam splitter or a dichroic beam splitter. A dichroic beam splitter can produce different spectral portions that can be measured and compared to assess substrate temperature. The apertures 312, 313 can be situated to be associated with slopes of different signs with respect to Z-axis displacement as shown in FIGS. 3B-3C. The tilt plate 308 can be adjusted to suitably locate or "bias" the beams in respective apertures. Referring to FIG. 3A, emitted radiation from the area 304 is directed along an axis 340 and is incident to the aperture plates 316, 317 near edges so that the emitted radiation is attenuated, corresponding to bias locations such as 350, 351 in FIGS. 3B-3C. With the area 304 displaced as area 304', the emitted radiation is focused along an axis 342 more centrally into the aperture 312 and more toward an edge of the aperture 313, thus detected power associated with the aperture 312 increases and detected power associated with aperture 313 decreases as shown in FIGS. 3B-3C, respectively. Rotations of the tilt plate 308 displace the axes 340, 342 so that attenuation of beams propagating along these axes to the apertures 312, 313 can be adjusted. For example, a rotation can be applied to attenuate 10%, 20%, 30%, 40%, 50%, 60%, 70%, 80%, 90% or other value in a range of 0-100%. If a beam is incident to an aperture and centered on the aperture initially, subsequent changes in Z-position reduce beam power received at an associated detector but generally do not provide an indication of a direction of Z-changes. For example, with a suitable rotation of the tilt plate 308, a +Z direction position change can be associated with an increased received beam power at the detector 320 and a −Z direction position change can be associated with a decreased beam power at the detector 320. Thus, changes in received beam power can be related to both a magnitude and a direction of Z-axis position changes of the area 304 of the substrate 306.

In this example, received optical power from a melt pool is dependent on melt pool temperature, but optical powers in each of the detectors 320, 321 are proportional so that a ratio or other combination can be used to reduce or eliminate temperature dependence in Z-sensor optical powers and a separate temperature sensor is not needed. In this and other examples, Z-sensors include circular or oval apertures but slits, opaque or reflective spots, rectangles, other curved or polygonal shapes, or detector sizes themselves can be used instead. Dimensions of the apertures 312, 313 along axes 315, 319, respectively, are selected based on beam dimensions to provide selected beam attenuations as a function of Z-axis displacements of the area 304.

Representative Linear Detector Z-Sensor

Referring to FIG. 4A, a representative Z-sensor 400 includes a linear detector 402 that is situated to receive optical radiation from a surface 404 of a melt pool on a substrate 405 along a tilted axis 414. The linear detector 402 is typically a unitary linear photodiode array such as a self-scanned diode array that includes photodiodes arranged along an axis 403, but other linear arrangements can be used such as two or more discrete photodiodes. As shown, as the surface 404 of the melt pool grows along an axis 405 by an amount AZ to become a displaced surface 404', a beam from the surface of the melt pools (i.e., 404 or 404' formed by a lens 411) initially propagating along the tilted axis 414 propagates along a displaced axis 416. However, depending the configuration of the lens 411 and any associated optics, a displaced axis can be either above or below an initial axis at the linear detector 402. The linear detector 402 is coupled to a processor 410 that is operable to determine melt pool temperature and Z-axis displacements. A Z-axis controller 412 is coupled to the processor 402 and to substrate stages, processing beam optics, or both to adjust Z-axis position as needed. In FIG. 4A, emitted radiation from the surface 404 is directed and focused along the tilted axis 414 to a focus spot 450 while emitted radiation from a displaced surface 404' is directed an axis 416 to a focus spot 452, producing displaced focused spots at the linear detector 402. As shown, a +Z displacement of the melt pool surface produces a downward shift of the focused spot 450, but in other examples, an upward shift can be produced.

For example, referring to FIG. 4B, the focused spot 450 produced at the linear detector 402 along the axis 414 is situated in an active area 451 of the linear detector 402. A focused spot 452 produced at the linear detector 402 along the axis 416 is situated in the active area 451 and displaced along an axis 454 of the linear detector. Thus, displacements of the melt pool produce displacements of the focused spots 450, 452 and the positions of the focused spot indicate Z-locations. With a linear sensor, power need not be measured accurately, and detector elements can be allowed to saturate. Beam centers on the linear detector can be found from edge locations at which detector elements have linear or other response or from identification of a middle of a saturated spot.

FIG. 4C illustrates a representative linear sensor assembly 460 that includes a linear sensor 462 and a cylindrical lens 464 situated to increase optical power delivered to the linear sensor 462.

Representative Dual Beam Linear Detector Z-Sensor

Figures 5A, 5C, 5D:
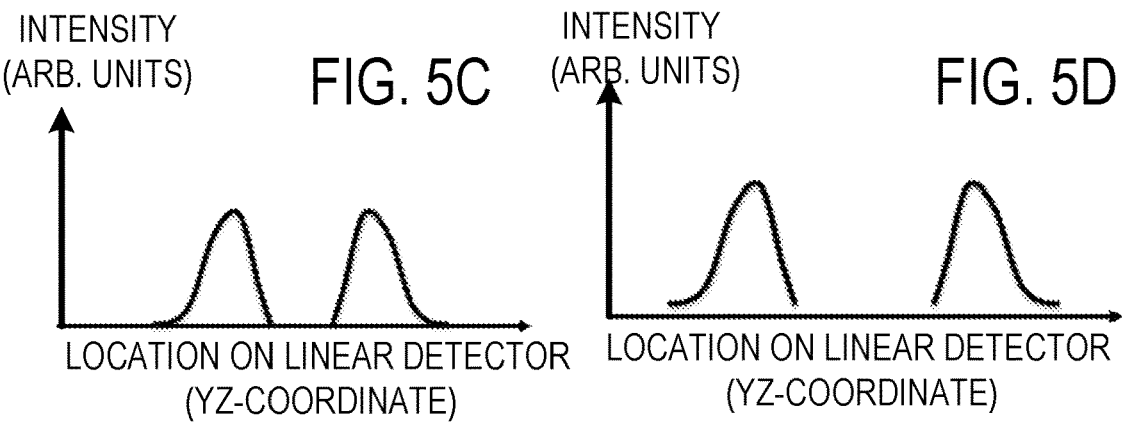
FIG. 5A illustrates a portion of an AMS that includes an optical height sensor that includes a linear detector array situated to receive dual detection beams.
FIGS. 5C-5CD illustrate optical power at the linear detector array of FIG. 5A.

Referring to FIG. 5A, a representative dual beam linear detector Z-sensor 500 is similar to that of FIG. 4A but includes a beam splitter 550 and a tilt plate 552. The beam splitter 550 directs first and second beam portions from a working surface 506 along respective axis portions 502, 503 to mirrors, prisms, or other reflectors 560, 562 so that the first and second beam portions are incident to different areas of a linear detector 556. The beam portions are generally focused to produce first and second beam spots at the linear detector 556. When the working surface 506 is displaced by ΔZ shown as working surface 506', the beam portions are directed along axis portions 512, 513 and are focused as respective first and second spots that are displaced with respect to the beam spots associated with the previous location of the working surface. The tilt plate 552 can be rotated to select suitable locations for the beam spots.

FIG. 5B illustrates an active area 570 of the linear detector 556 and shows first and second beam spots 572, 573 associated with the working surface 506 and first and second beam spots 574, 575 associated with the working surface 506'. FIGS. 5C-5D illustrate beam spot intensities as a function of position on the active area 570. FIG. 5C corresponds to working surface 506; FIG. 5D corresponds to working surface 506'. As illustrated, in the configuration of FIG. 5A the beam spots move apart as the working surface is moved up.

The beam splitter 550 can be a dichroic beam splitter so that beam spots such as the beam spots 572, 573 are associated with different spectral portions of the beam from the working surface 506. Differences in powers or spot shapes using spectral portions can permit estimation of working surface temperature.

Representative Dual Beam Linear Detector Z-Sensor with Crossed Beams

Figures 6A, 6B, 6C, 6D:
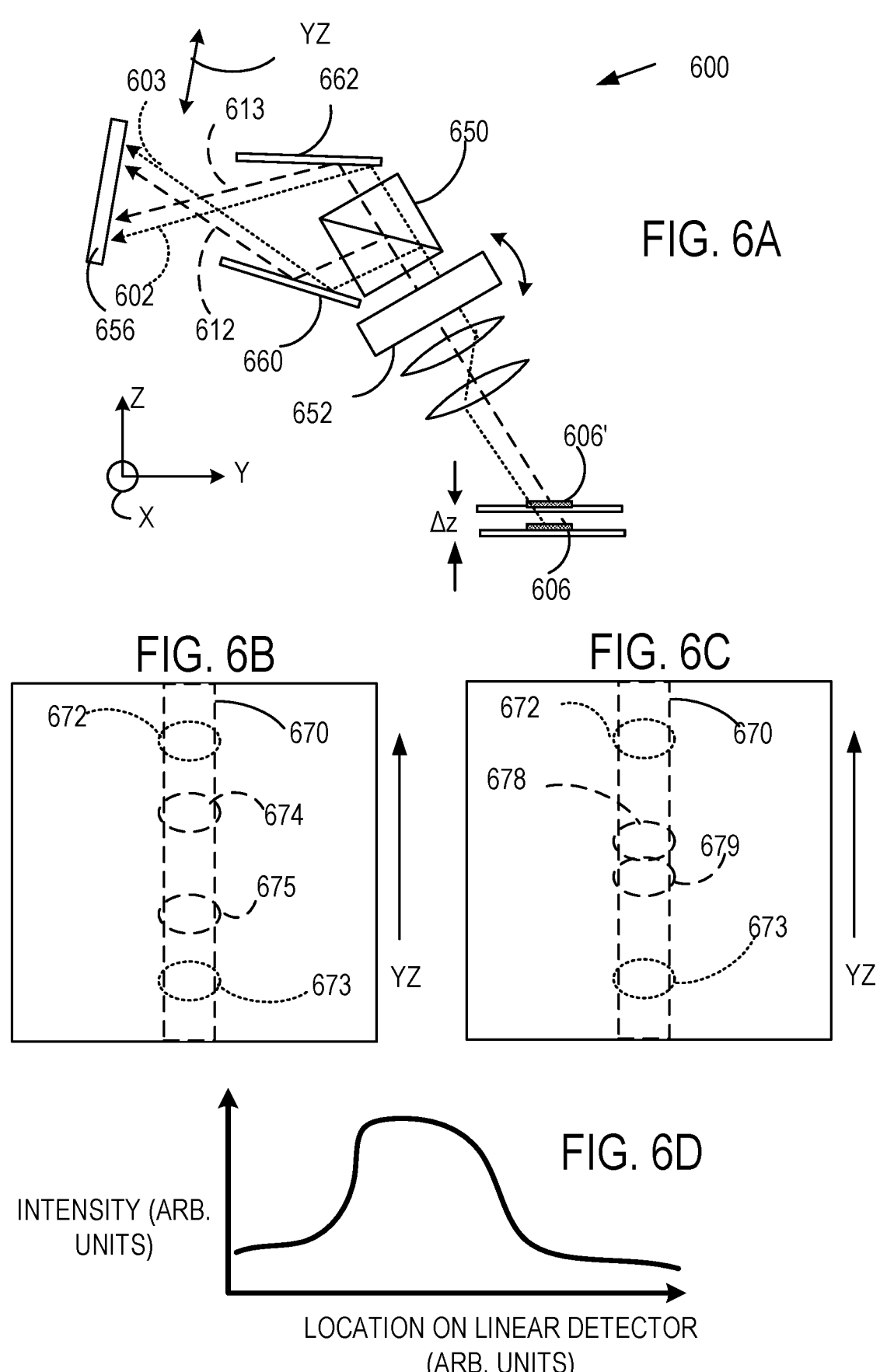
FIG. 6A illustrates a portion of an AMS that includes an optical height sensor having a linear detector array situated to receive dual detection beams with crossed optical paths.
FIGS. 6B-6C illustrate focused spot positions on the linear detector array of FIG. 6A for different heights.
FIG. 6D illustrates optical power at the linear detector array of FIG. 6A for the focused spots shown in FIG. 6C.

Referring to FIG. 6A, a representative dual beam linear detector Z-sensor 600 is similar to that of FIG. 5A and includes a beam splitter 650 and a tilt plate 652. The beam splitter 650 directs first and second beam portions from a working surface 606 along respective axis portions 602, 603 to mirrors, prisms, or other reflectors 660, 662 so that the first and second beam portions are incident to different areas of a linear detector 656. The beam portions are generally focused to produce first and second beam spots at the linear detector 656. When the working surface 606 is displaced by ΔZ shown as working surface 606', the beam portions are directed along axis portions 612, 613 and are focused as respective first and second spots that are displaced with respect to the beam spots associated with the previous location of the working surface. The tilt plate 652 can be rotated to select suitable locations for the beam spots. In contrast to FIG. 5A, the propagation axes associated with the beam portions cross and the beam spots at the linear detector move closer together with increases in working surface height as illustrated in FIGS. 6B-6C.

FIG. 6B illustrates an active area 670 of the linear detector 656 and shows first and second beam spots 672, 673 associated with the working surface 606 and first and second beam spots 674, 675 associated with the working surface 606'. In a further example shown in FIG. 6C, the active area 670 receives the first and second beam spots 672, 673 associated with the working surface 606 and first and second beam spots 678, 679 associated with the working surface 606'. In this example, the first and second beam spots 678, 679 are in contact and are beginning to merge. A representative power distribution at the linear detector 656 is illustrated in FIG. 6D.

Representative Z-Sensing Methods

Figure 7:
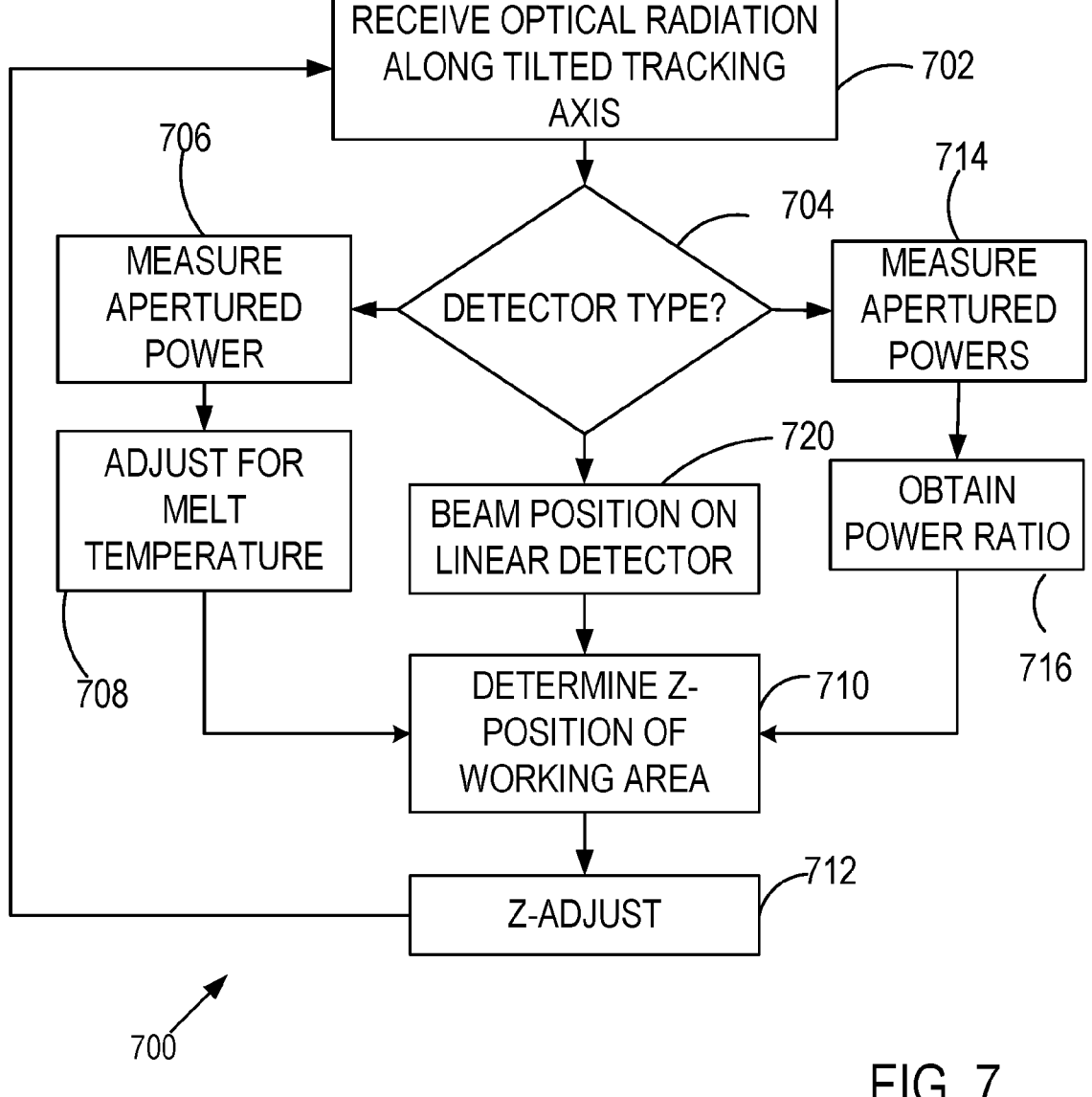
FIG. 7 illustrates a representative manufacturing method that includes optical height sensing as disclosed herein.

Referring to FIG. 7, a representative method 700 includes receiving optical radiation from a working surface along a tilted axis at 702. The optical radiation can be emitted radiation from a melt pool, a portion of a processing beam, or a portion of a dedicated Z-sensing beam. For example, thermal radiation emitted by the melt pool, scattered or reflected portions of a processing beam, or scattered or reflected portions of a Z-axis interrogation beam from a dedicated Z-axis source can be used. In order to accommodate different sensing configurations, at 704 a detector or sensor type is selected. If a single element photodetector is used, at 706 optical power transmitted by an aperture situated about the tilted axis is measured and at 708, the measured power is corrected, if needed, for melt pool temperature. At 710, a Z-location is determined and at 712, the Z-location of a substrate or a processing beam focus can be adjusted, or other processing conditions adapted based on the determined Z-location.

If dual single element detectors are used, at 714, optical powers transmitted by respective apertures situated about the tilted axis are measured and a power ratio obtained at 716. At 710, the Z-location is determined, and Z-axis or process adjustments are made at 712, If a linear detector is used, beam position(s) on the linear detector are measured at 720, and at 710, Z-location is determined and adjusted at 712. In some cases, measured Z-location is used to discontinue or accelerate material deposition at one or more locations by controlling processing beam diameter, processing beam optical power, or material flow, and Z-location need not be adjusted.

Representative Z Calibration

Figure 8:
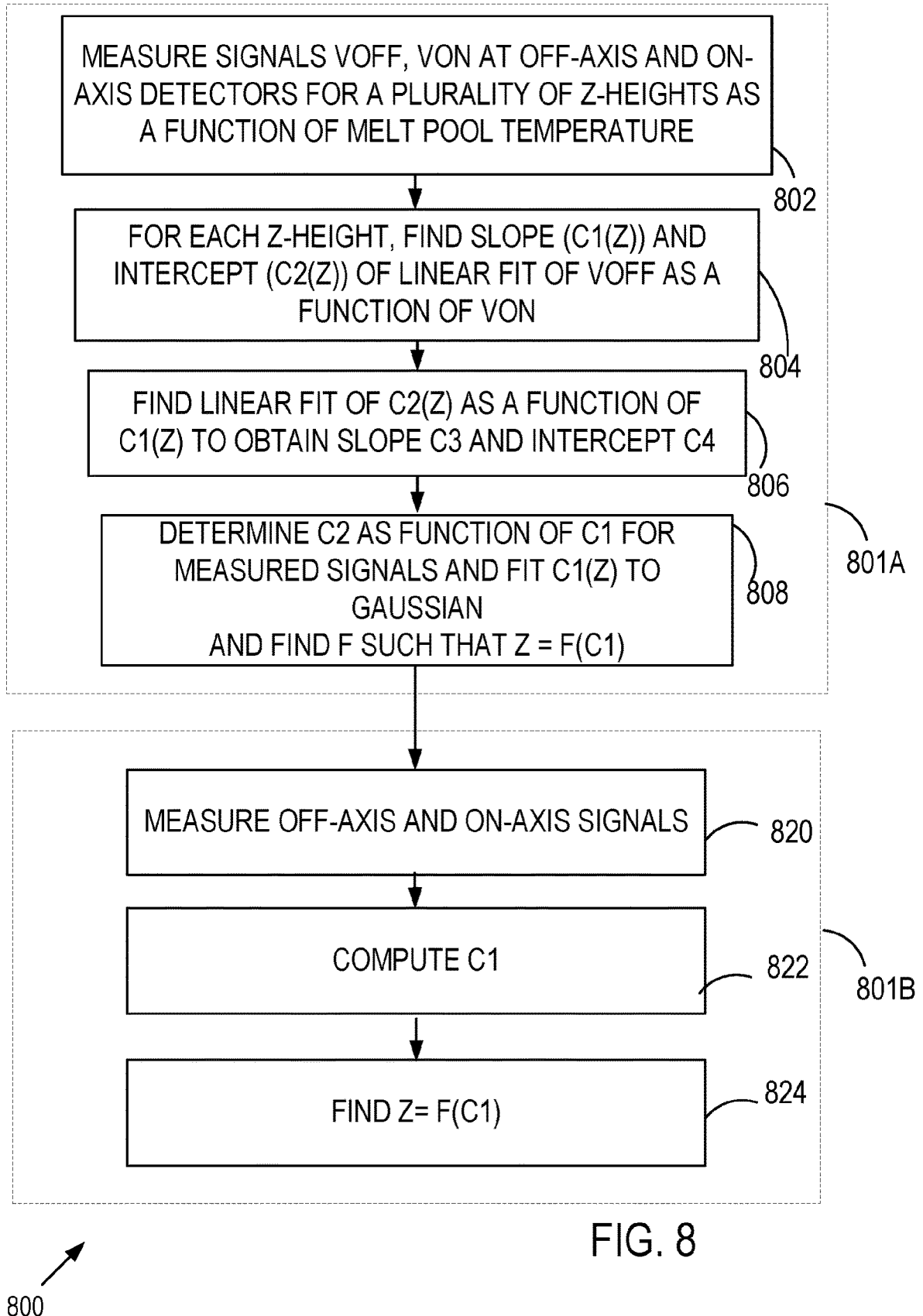
FIGS. 8-8C illustrate a calibration method for using an on-axis and an off-axis signal pixel photodetector to measure height about a melt pool.
Figure 8A:
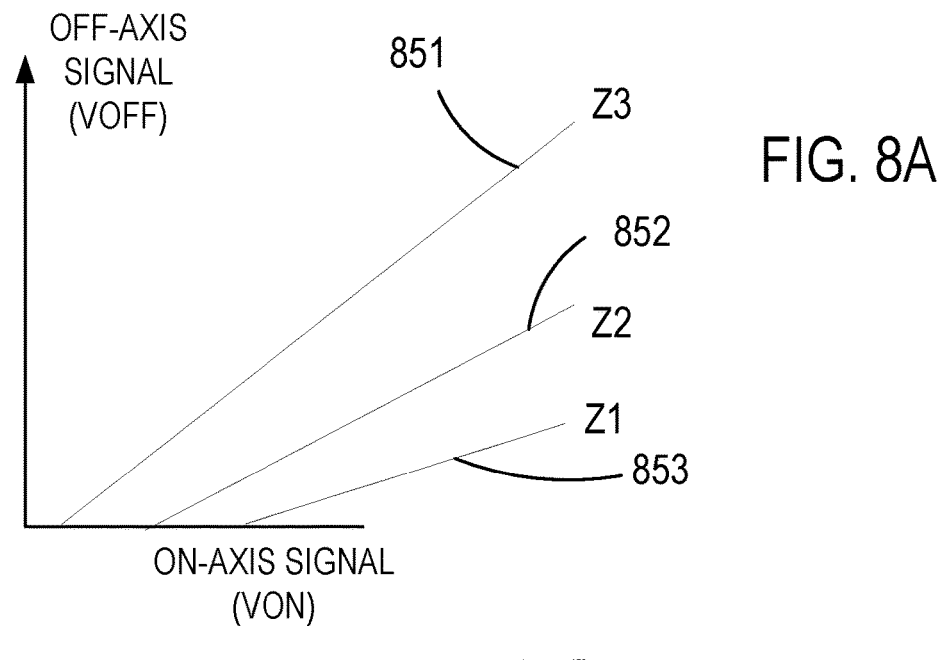
Figure 8B:
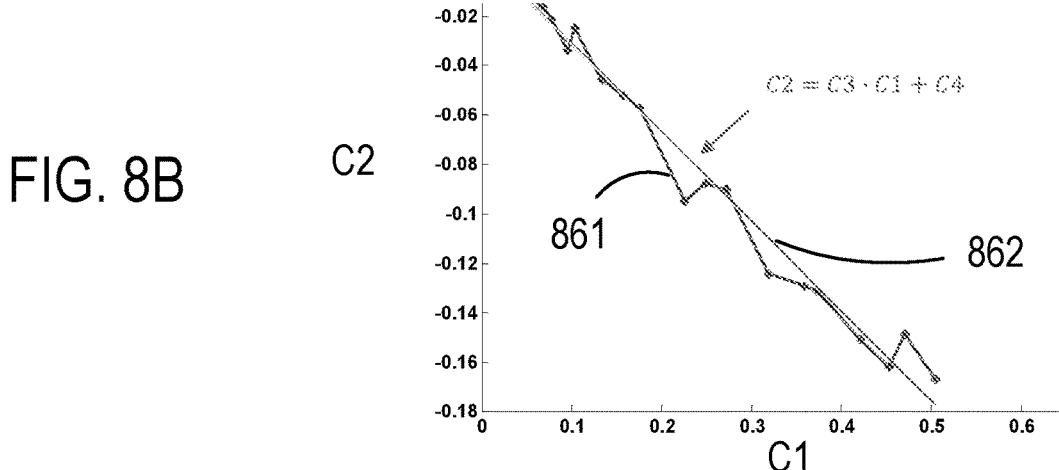
Figure 8C:
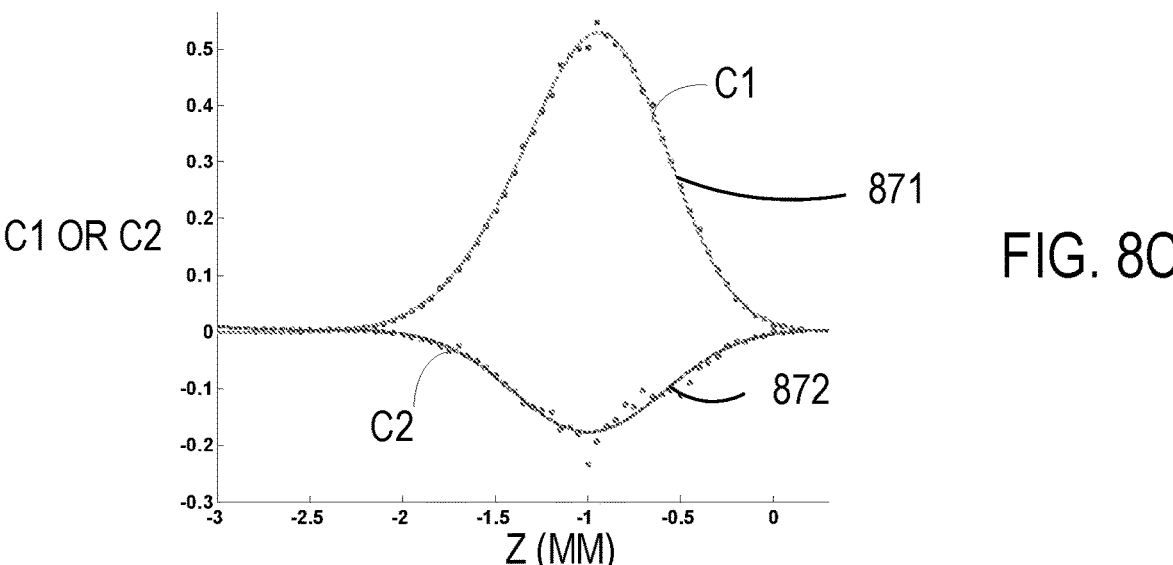

Signals from on-axis and off-axis detectors can be used to determine height using a look-up table or other approach. Referring to FIGS. 8-8C, a representative method 800 includes a calibration method 801A and a height measurement method 801B. At 802, signals at an on-axis detector and an off-axis detector (VON, VOFF, respectively) are measure for a plurality of heights Z as a function of melt pool temperature. The resulting data appears similar to the curves 851-853 shown in FIG. 8A for three heights Z1-Z3. For the data at each height Z, a slope (C1) and intercept (C2) of a linear fit to VOFF as a function of VON is calculated at 804. The slopes and intercepts are different for each height Z so that $C1=C1(Z)$ and $C2=C2(Z)$. At 806, a linear fit of $C2(Z)$ as a function of $C1(Z)$ having a slope C3 and an intercept C4. FIG. 8B shows a representative graph of $C2(Z)$ as a function of $C1(Z)$ as measured 861 along with a linear fit 862. At 808, $C1(Z)$ is fit to a Gaussian shown as a curve 871 in FIG. 8C. $C2(Z)$ is shown as similarly fit to a Gaussian as curve 872 in FIG. 8C, but only one of $C1(Z)$ and $C2(Z)$ is needed. At 808, this fit is inverted to find $Z=F(C1)$, wherein F is an inverse of a Gaussian, i.e., if $C1(Z)$ is fit to a Gaussian as $C1(Z)=A \exp[-aZ^2]$, wherein A, a are fitting constants, then $Z=[in (A/C1)/a]^{1/2}$. C3, C4, and F (the fitting constants A, a) are stored for use in measurements. While representative measured data are shown graphed in FIGS. 8A-8C, the graphs are for convenient illustration and are not needed to execute the necessary calibration steps.

With the calibration method 801A complete, a height measurement can be made as shown in the method 801B. At 820, off-axis and on-axis signals are measured at the respective detectors and at 822, C1 is calculated as $C1=(VOFF-C4)/(VON+C3)$, where C3, C4 have been previously obtained in calibration. With C1, height can be found as $Z=F(C1)$ at 824 wherein F was previously determined in calibration.

Representative Manufacturing Methods

Figure 9:
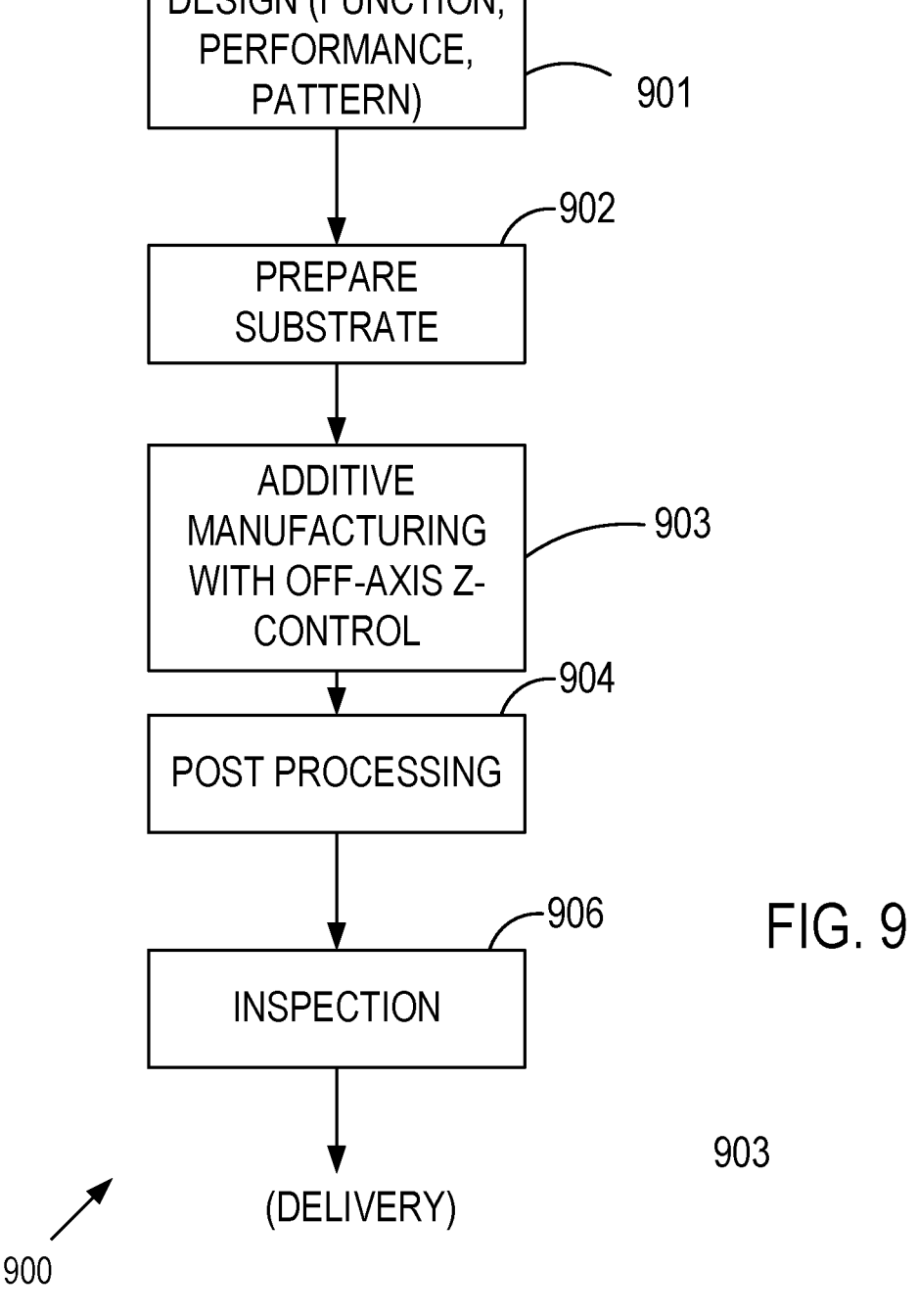
FIG. 9 illustrates an additive manufacturing method using the disclosed methods and apparatus for height sensing.

Referring to FIG. 9, a representative method 900 includes selecting or producing a suitable part design at 901 and preparing a substrate at 902. At 903, additive manufacturing is used to fabricate a part according to the design while measuring height using one or more optical beams propagating along one or more axes that are tilted with respect to the substrate surface or a work area such as a melt pool on the substrate. Based on the measured height, height or processing parameters can be adjusted. At 904, the manufactured part is post processed as needed such as, for example, to polish or smooth surface or remove excess material added by the manufacturing process. At 906, the part is inspected prior to delivery.

The processing beam from the AMS may include a beam such as a laser beam, synchrotron radiation, an X-ray beam, an electron beam, an ion beam, or other beam. An operator may use only one of the dual detectors as needed. For example, the user may switch between the two detectors to observe the melt pool using only one of an on-axis detector and an off-axis detector.

In view of the many possible embodiments to which the principles of the disclosed technology may be applied, it should be recognized that the illustrated embodiments are only preferred examples of the invention and should not be taken as limiting the scope of the disclosure. I claim as my invention all that comes within the scope and spirit of the appended claims and all novel and non-obvious features and combination of features disclosed.

Innovative Features

Innovative features described herein include, but are not limited to, the following.

| | Feature |
|---|---|
| A1 | An apparatus, comprising: a tracking optical system situated along a tracking axis, the tracking optical system comprising at least one focus element and at least one photodetector, wherein the at least one focus element is situated to receive optical radiation from a melt pool and direct the received optical radiation toward the photodetector, wherein the tracking axis is tilted with respect to a processing axis and the photodetector includes at least one single pixel photodetector or a linear detector; and an optical receiver coupled to the photodetector and operable to produce a tracking signal associated with a position of the melt pool along the processing axis or a melt pool axis perpendicular to the melt pool based on the received optical radiation directed to the photodetector. |
| A2 | The apparatus of A1, wherein the tracking axis is tilted by an angle of at least 5, 10, 15, 20, 25, 30, 35, 40, 45, 50, 60, 70, 80, or 90 degrees with respect to the processing axis or the melt pool axis. |
| A3 | The apparatus of any of A1-A2, wherein the optical system further comprises an aperture plate that is situated to attenuate the received optical radiation directed toward the photodetector. |
| A4 | The apparatus of any of A1-A3, wherein the at least one optical element is a lens that is situated to focus the received optical radiation from the melt pool proximate the aperture plate. |
| A5 | The apparatus of and of A1-A4, wherein the aperture plate defines a circular aperture, a rectangular aperture, a slit, or two or more aperture edges. |
| A6 | The apparatus of any of A1-A5, wherein the aperture is a slit or is defined by two or more aperture edges. |
| A7 | The apparatus of any of A1-A6, wherein an aperture plate is situated to block between 20% and 80% of the received optical radiation from the focus element so that beam displacements in opposite directions produce opposite changes in received optical power. |
| A8 | The apparatus of any of A1-A7 further comprising a processing beam source operable to produce the processing beam and a positioning element that is responsive to the tracking signal to adjust a relative position of the melt pools and the tracking axis. |
| A9 | The apparatus of any of A1-A8, wherein the positioning element is a stage operable to adjust the position of the melt pool along the processing axis or the melt pool axis. |
| A10 | The apparatus of any of A1-A9, further wherein at least one detector of the tracking optical system includes a first detector and a second detector and situated so that the optical receiver is operable to produce a corresponding first tracking signal and a second tracking signal associated with the position of the melt pool along the processing axis based on portion so of the received |

-continued

| | Feature |
|---|---|
| | optical radiation, wherein the first tracking signal and the second tracking signal have opposite slopes with respect to changes in position of the melt pool along the processing axis or the melt pool axis. |
| A11 | The apparatus of any of A1-A10, wherein the optical system further comprises a first aperture plate and a second aperture plate situated to attenuate the received optical radiation directed toward the first detector and the second detector, respectively. |
| A12 | The apparatus of and of A1-A11, wherein the at least one photodetector is a linear detector array. |
| A13 | The apparatus of any of A1-A12, wherein the optical receiver is coupled to the photodetector and operable to produce the tracking signal associated with a position of the melt pool along the processing axis based on a location at which the received optical radiation is incident to the photodetector. |
| A14 | The apparatus of any of A1-A13, wherein the position of the melt pool along the processing axis or the melt pool axis is based on a centroid of an intensity pattern of the radiation incident to the photodetector. |
| A15 | The apparatus of any of A1-A14, further comprising a processing beam source operable to produce the processing beam and a positioning element that is responsive to the tracking signal to adjust a relative position of the melt pool and the tracking axis. |
| A16 | The apparatus of any of A1-A15, further comprising a beam splitter situated to direct a first portion and a second portion of the received optical radiation to corresponding first and second regions of the linear detector array. |
| A17 | The apparatus of any of A1-A16, wherein the first portion and the second portion of the received optical radiation are different spectral portions and the beam splitter is a dichroic beam splitter that selectively directs the different spectral portions to the corresponding first and second regions of the linear detector array. |
| A18 | The apparatus of any of A1-A17, wherein the beam splitter is situated so that the first portion and the second portion of the received optical radiation are directed to corresponding first and second regions of the linear detector array having a separation that increases with increasing distance to the melt pool. |
| A19 | The apparatus of any of A1-A18, wherein the optical radiation received from the melt pool is one or more of thermal radiation emitted by the melt pool in response to a processing beam, portions of the processing beam, or portions of an interrogation beam from an interrogation beam source. |
| B1 | A system, comprising: a processing beam source situated to direct a processing beam along a processing axis to a working area of a substrate so that the processing beam is focused at the working area; and an optical focus sensor situated to receive optical radiation from the working area in response to the processing beam along an axis that is tilted with respect to the processing axis and establish a position of a processing beam focus with respect to the working area, the optical focus sensor including at least one of a single pixel detector and a linear detector situated to receive the optical radiation. |
| C1 | A method, comprising: receiving optical radiation from a work area of a substrate along a tracking axis that is tilted with respect to a substrate axis that is perpendicular to the work area; measuring power of the optical radiation received from the work area and transmitted by an aperture situated along the tracking axis; and based on the measured power, determining a displacement of the work area along the substrate axis; and adjusting at least one processing parameter based on the determined displacement. |
| C2 | The method of C1, wherein the processing parameter is a position of the work area. |

-continued

| | Feature |
|---|---|
| C3 | The method of any of C1-C2, wherein the optical radiation from the work area is produced by irradiation of the work area with a processing beam or is a portion of a tracer beam directed to the work area. |
| C4 | The method of any of C1-C3, wherein the displacement of the work area is adjusted by moving the work area along the substrate axis or adjusting a processing beam that is directed to the work area. |
| C5 | The method of any of C1-C4, wherein the optical radiation is associated with a melt pool produced by a processing beam. |
| C6 | The method of any of C1-C5, wherein the optical radiation is thermal radiation associated with the melt pool. |
| C7 | The method of any of C1-C6, further comprising: estimating a temperature of the melt pool; and adjusting the measured power based on the estimated temperature, wherein the displacement of the work area along the substrate axis is determined based on the adjusted measured power. |
| C8 | The method of any of C1-C7, wherein measuring the power comprises measuring first and second powers of the optical radiation received from the work area and transmitted by first and second apertures situated along the tracking axis, wherein the displacement of the work area along the substrate axis is determined based on the first and second powers. |
| D1 | A method, comprising: receiving optical radiation from a work area of a substrate along a tracking axis that is tilted with respect to a substrate axis that is perpendicular to the work area; directing the received optical radiation to a linear detector; based on a location at which the received optical radiation is incident to the linear detector, determining a displacement of the work area along the substrate axis; and adjusting at least one processing parameter based on the determined displacement. |
| D2 | The method of D1, wherein the processing parameter is the displacement of the work area. |
| D3 | The method of any of D1-D2, wherein the received optical radiation from the work area is one or more of thermal radiation emitted from the substrate, portions of a processing beam directed to the substrate, or portions of an interrogation beam directed to the substrate from an interrogation beam source. |
| E1 | A detecting device that detects a melt pool produced by a processing beam, comprising: a first light receiving device that receives a first radiation along a first axis emitted from the melt pool; and a second light receiving device that receives a second radiation along a second axis inclined with respect to the first axis emitted from the melt pool. |
| E2 | The detecting device of E1, wherein the first light receiving device includes a first condensing optical system that condenses the first radiation and a first photodetector that photoelectrically converts the condensed first radiation. |
| E3 | The detecting device of any of E1-E2, wherein the first light receiving device includes an aperture member defining an aperture situated at a condensing position of the first radiation by the first condensing optical system, and the first photodetector receives the first radiation through the aperture of the aperture member. |
| E4 | The detecting device of any of E1-E3, wherein the first photodetector includes a linear detector arranged at a condensing position of the first radiation by the first condensing optical system and includes photoelectric conversion elements arranged in a one-dimensional direction. |

| | Feature |
|---|---|
| E5 | The detecting device of any of E1-E4, wherein a first angle formed by a propagation axis of the processing beam and the first axis is larger than a second angle formed between a propagation axis of the processing beam and the second axis. |
| E6 | The detecting device of any of E1-E5, wherein a second angle formed between a propagation axis of the processing beam and the second axis is different from a third angle formed between the propagation axis of the processing beam and an axis of specular reflection of the processing beam from the melt pool. |
| E7 | The detecting device of any of E1-E6, wherein a second angle formed between a propagation axis of the processing beam and the second axis is smaller than a third angle formed between the propagation axis of the processing beam and an axis of specular reflection of the processing beam from the melt pool. |
| E8 | The detecting device of any of E1-E8, wherein a second angle formed between a propagation axis of the processing beam and the second axis is larger than a third angle formed between the propagation axis of the processing beam and an axis of specular reflection of the processing beam from the melt pool. |
| E9 | The detecting device of any of E1-E8, wherein the second axis is slightly tilted from the propagation axis of the processing beam. |
| E10 | The detecting device of any of E1-E9, wherein the second axis is substantially parallel to the propagation axis of the processing beam. |
| E11 | The detecting device of any of E1-10, further comprising a folding member that is arranged in an optical path of the processing beam and bends the second axis. |
| E12 | The detecting device of and of E1-E11, wherein the second radiation is received by the second light receiving device via the folding member. |
| E13 | The detecting device of any of E1-E12, further comprising a controller, wherein a first light receiving device includes a first photodetector that photoelectrically converts the first radiation, the second light receiving device includes a second photodetector that photoelectrically converts the second radiation, and controller calculates a first output from the first photodetector and a second output from the second photodetector. |
| E14 | The detecting device of any of E1-E13, wherein the controller obtains a dimension of the melt pool based on the first output and the second output. |
| E15 | The detecting device of any of E1-E14, wherein the dimension of the melt pool includes at least one of height of the melt pool and size of the melt pool. |
| E16 | The detecting device of any of E1-E15, wherein the dimension of the melt pool includes at least one transverse dimension of the melt pool. |
| F1 | A processing device that processes a workpiece by forming a melt pool on the workpiece with a processing beam comprising: the detecting device of any of E1-E16. |
| F2 | The processing device of F1, further comprising a property changing device that changes a property of the processing beam based on an output from the property changing device. |
| F3 | The processing device of any of F1-F2, further comprising a material supply device that supplies materials to the melt pool. |
| F4 | The processing device of any of F1-F3, wherein the processing device builds an object on the workpiece by supplying the materials to the melt pool. |

We claim:

1. A detecting device that detects a melt pool produced by a processing beam that forms the melt pool, the detecting device comprising:

a first light receiving device that receives a first radiation emitted from the melt pool along a first axis and caused by the processing beam;

a second light receiving device that receives a second radiation emitted from the melt pool along a second axis inclined with respect to the first axis and caused by the processing beam; and a controller, wherein the first light receiving device includes a first photodetector that photoelectrically converts the first radiation, the second light receiving device includes a second photodetector that photoelectrically converts the second radiation, and the controller calculates a first output from the first photodetector and a second output from the second photodetector to obtain a dimension of the melt pool based on the first output and the second output.

2. The detecting device of claim 1, wherein the first light receiving device includes a first condensing optical system that condenses the first radiation, and the first photodetector photoelectrically converts the condensed first radiation.

3. The detecting device of claim 2, wherein the first light receiving device includes an aperture member defining an aperture situated at a condensing position of the first radiation by the first condensing optical system, and the first photodetector receives the first radiation through the aperture of the aperture member.

4. The detecting device of claim 2, wherein the first photodetector includes a linear detector arranged at a condensing position of the first radiation by the first condensing optical system and includes photoelectric conversion elements arranged in a one-dimensional direction.

5. The detecting device of claim 1, wherein a first angle formed by a propagation axis of the processing beam and the first axis is larger than a second angle formed between the propagation axis of the processing beam and the second axis.

6. The detecting device of claim 5, wherein the second axis is slightly tilted from the propagation axis of the processing beam.

7. The detecting device of claim 5, wherein the second axis is substantially parallel to the propagation axis of the processing beam.

8. The detecting device of claim 5, further comprising a folding member that is arranged in an optical path of the processing beam and bends the second axis.

9. The detecting device of claim 8, wherein the second radiation is received by the second light receiving device via the folding member.

10. The detecting device of claim 1, wherein a second angle formed between a propagation axis of the processing beam and the second axis is different from a third angle formed between the propagation axis of the processing beam and an axis of specular reflection of the processing beam from the melt pool.

11. The detecting device of claim 1, wherein a second angle formed between a propagation axis of the processing beam and the second axis is smaller than a third angle formed between the propagation axis of the processing beam and an axis of specular reflection of the processing beam from the melt pool.

12. The detecting device of claim 1, wherein a second angle formed between a propagation axis of the processing beam and the second axis is larger than a third angle formed between the propagation axis of the processing beam and an axis of specular reflection of the processing beam from the melt pool.

13. The detecting device of claim 1, wherein the dimension of the melt pool includes at least one of a height of the melt pool and a size of the melt pool.

14. The detecting device of claim 1, wherein the dimension of the melt pool includes at least one transverse dimension of the melt pool.

15. A processing device that processes a workpiece by forming a melt pool on the workpiece with a processing beam comprising: the detecting device of claim 1.

16. The processing device of claim 15, further comprising a property changing device that changes a property of the processing beam based on an output from the property changing device.

17. The processing device of claim 15, further comprising a material supply device that supplies materials to the melt pool.

18. The processing device of claim 17 wherein the processing device builds an object on the workpiece by supplying the materials to the melt pool.

19. The detecting device according to claim 1, further comprising:

a processing beam source situated to direct the processing beam along a processing axis to a working area of a substrate so that the processing beam is focused at the working area, the second light receiving device comprising an optical focus sensor situated to receive optical radiation from the working area in response to the processing beam along an axis that is tilted with respect to the processing axis and establish a position of a processing beam focus with respect to the working area, the optical focus sensor including the second photodetector which is at least one of a single pixel detector and a linear detector situated to receive the optical radiation.

20. A detecting device that detects a melt pool produced by a processing beam that forms the melt pool, the detecting device comprising:

a first light receiving device that receives a first radiation emitted from the melt pool along a first axis and caused by the processing beam; and a second light receiving device that receives a second radiation emitted from the melt pool along a second axis inclined with respect to the first axis and caused by the processing beam, wherein the second light receiving device comprises:

a tracking optical system situated along a tracking axis, the tracking optical system comprising at least one focus element and at least one photodetector, wherein the at least one focus element is situated to receive optical radiation from the melt pool and direct the received optical radiation toward the at least one photodetector, wherein the tracking axis is tilted with respect to a processing axis of the processing beam and the at least one photodetector includes at least one single pixel photodetector or a linear detector; and an optical receiver coupled to the at least one photodetector and operable to produce a tracking signal associated with a position of the melt pool along the processing axis or a melt pool axis perpendicular to the melt pool based on the received optical radiation directed to the at least one photodetector.

21. The detecting device of claim 20, wherein the tracking axis is tilted by an angle of at least 5, 10, 15, 20, 25, 30, 35, 40, 45, 50, 60, 70, 80, or 90 degrees with respect to the processing axis or the melt pool axis.

22. The detecting device of claim 20, wherein the tracking optical system further comprises an aperture plate that is situated to attenuate the received optical radiation directed toward the at least one photodetector.

23. The detecting device of claim 22, wherein the at least one focus element is a lens that is situated to focus the received optical radiation from the melt pool proximate the aperture plate.

24. The detecting device of claim 23, wherein the aperture plate defines a circular aperture, a rectangular aperture, a slit, or two or more aperture edges.

25. The detecting device of claim 23, wherein an aperture of the aperture plate is a slit or is defined by two or more aperture edges.

26. The detecting device of claim 20, wherein an aperture plate is situated to block between 20% and 80% of the received optical radiation from the at least one focus element so that beam displacements in opposite directions produce opposite changes in received optical power.

27. The detecting device of claim 20, further comprising a processing beam source operable to produce the processing beam and a positioning element that is responsive to the tracking signal to adjust a relative position of the melt pool and the tracking axis.

28. The detecting device of claim 27, wherein the positioning element is a stage operable to adjust the position of the melt pool along the processing axis or the melt pool axis.

29. The detecting device of claim 20, wherein at least one detector of the tracking optical system includes a first detector and a second detector situated so that the optical receiver is operable to produce a corresponding first tracking signal and a second tracking signal associated with the position of the melt pool along the processing axis based on a portion of the received optical radiation, wherein the first tracking signal and the second tracking signal have opposite slopes with respect to changes in the position of the melt pool along the processing axis or the melt pool axis.

30. The detecting device of claim 29, wherein the tracking optical system further comprises a first aperture plate and a second aperture plate situated to attenuate the received optical radiation directed toward the first detector and the second detector, respectively.

31. The detecting device of claim 20, wherein the at least one photodetector is a linear detector array.

32. The detecting device of claim 31, wherein the optical receiver is coupled to the at least one photodetector and operable to produce the tracking signal associated with a position of the melt pool along the processing axis based on a location at which the received optical radiation is incident to the at least one photodetector.

33. The detecting device of claim 32, wherein the position of the melt pool along the processing axis or the melt pool axis is based on a centroid of an intensity pattern of the radiation incident to the at least one photodetector.

34. The detecting device of claim 33, further comprising a processing beam source operable to produce the processing beam and a positioning element that is responsive to the tracking signal to adjust a relative position of the melt pool and the tracking axis.

35. The detecting device of claim 31, further comprising a beam splitter situated to direct a first portion and a second portion of the received optical radiation to corresponding first and second regions of the linear detector array.

36. The detecting device of claim 35, wherein the first portion and the second portion of the received optical radiation are different spectral portions and the beam splitter is a dichroic beam splitter that selectively directs the different spectral portions to the corresponding first and second regions of the linear detector array.

37. The detecting device of claim 35, wherein the beam splitter is situated so that the first portion and the second portion of the received optical radiation are directed to corresponding first and second regions of the linear detector array having a separation that increases with increasing distance to the melt pool.

38. The detecting device of claim 20, wherein the optical radiation received from the melt pool is one or more of thermal radiation emitted by the melt pool in response to the processing beam, portions of the processing beam, or portions of an interrogation beam from an interrogation beam source.

39. A detecting method of detecting a melt pool produced by a processing beam that forms the melt pool, the method comprising:

receiving a first radiation emitted from the melt pool along a first axis and caused by the processing beam, the first radiation received by a first light receiving device that includes a first photodetector that photoelectrically converts the first radiation;

receiving a second radiation emitted from the melt pool along a second axis inclined with respect to the first axis and caused by the processing beam, the second radiation received by a second light receiving device that includes a second photodetector that photoelectrically converts the second radiation; and calculating, by a controller, a first output from the first photodetector and a second output from the second photodetector to obtain a dimension of the melt pool based on the first output and the second output.

* * * * *